(12) United States Patent
Takebe et al.

(10) Patent No.: US 8,452,904 B2
(45) Date of Patent: May 28, 2013

(54) CLIENT SYSTEM, CLIENT CONTROL METHOD, AND COMPUTER-READABLE RECORDING MEDIUM CONFIGURED TO STORE CLIENT CONTROL PROGRAM USING VIRTUAL MACHINE FOR CONTROL BY CLIENT DEVICE

(75) Inventors: Akio Takebe, Kawasaki (JP);
Kenichirou Shimogawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 53 days.

(21) Appl. No.: 13/004,443

(22) Filed: Jan. 11, 2011

(65) Prior Publication Data
US 2011/0179418 A1    Jul. 21, 2011

(30) Foreign Application Priority Data
Jan. 15, 2010   (JP) ................. 2010-006671

(51) Int. Cl.
*G06F 13/12*   (2006.01)
*G06F 3/00*    (2006.01)

(52) U.S. Cl.
USPC ................... 710/62; 710/8; 710/10

(58) Field of Classification Search
None
See application file for complete search history.

(56) References Cited

U.S. PATENT DOCUMENTS
6,205,450 B1    3/2001   Kanome
2002/0171762 A1 11/2002  Maxson et al.
2007/0043928 A1* 2/2007  Panesar et al. ............ 711/206
2009/0240924 A1* 9/2009  Yasaki et al. ............. 712/220
2010/0064301 A1* 3/2010  Suzuki ..................... 719/324
2010/0115080 A1* 5/2010  Kageyama ................. 709/223

FOREIGN PATENT DOCUMENTS
JP    11-134117    5/1999
JP    2004-538680  12/2004
JP    2008-052407  3/2008

OTHER PUBLICATIONS

"Thin Client," Incept Inc., Web site, Nov. 18, 1999 [online] [Retrieved on Aug. 24, 2009] Retrieved from the Internet: <URL: http://e-words.jp/w/E382B7E383B3E382AFE383A9E382A4E382A2E383B3E38388.html> (1 page), English version: <URL: http://e-words.us/w/Thin20Client.html> (1 page).

* cited by examiner

Primary Examiner — Idriss N Alrobaye
Assistant Examiner — David Martinez
(74) Attorney, Agent, or Firm — Staas & Halsey LLP

(57) ABSTRACT

A client system using a virtual machine includes: a physical server that includes a CPU, a memory, a bus, and a plurality of bus adapters, manages a plurality of guest OS by a host OS, and operates as a virtual machine. A plurality of input and output units are coupled to the plurality of bus adapters of the physical server respectively. A host OS of the physical server includes a configuration definition table that stores identification numbers of the input and output units in correspondence to guest OSs used by the input and output units. The host OS notifies a guest OS corresponding to an input unit of input instruction information from the input units with reference to the configuration definition table and outputs a processing result of a guest OS to an output unit corresponding to the guest OS.

10 Claims, 20 Drawing Sheets

FIG. 5

| ITEMS | DESCRIPTION | EXAMPLE |
|---|---|---|
| First Guest_OS1 | GUEST OS NAME | guest_os_001 |
| USB_tree1 | GUEST OS OPERATION/DISPLAY USB DEVICE NUMBER | USB00,USB00_0,USB001,USB002 |
| pon_key1 | GUEST OS STARTUP KEY | guestOS1_PowerON_hooHOO |
| poff_key1 | GUEST OS FORCIBLE TERMINATION KEY | guestOS1_POFF_hooHOO |
| Second Guest_OS1 | GUEST OS NAME | guest_os_002 |
| USB_tree2 | GUEST OS OPERATION/DISPLAY USB DEVICE NUMBER | USB10,USB100,USB101,USB102 |
| ... | ... | |
| ... | | ... |
| Third Guest_OS3 | ... | |
| Fourth Guest_OS4 | | | the guest OS by virtualization technology.

CLIENT SYSTEM, CLIENT CONTROL METHOD, AND COMPUTER-READABLE RECORDING MEDIUM CONFIGURED TO STORE CLIENT CONTROL PROGRAM USING VIRTUAL MACHINE FOR CONTROL BY CLIENT DEVICE

CROSS-REFERENCE TO RELATED APPLICATION

This application is based upon and claims the benefit of priority of the prior Japanese Patent Application No. 2010-6671, filed on Jan. 15, 2010, the entire contents of which are incorporated herein by reference.

FIELD

Embodiments discussed herein relate to a client system, a client control method, and a computer-readable recording medium configured to store a client control program that are performed by using a virtual machine.

BACKGROUND

Along with the spread of a personal computer in recent years, there has been increasing operational and management costs for installing or upgrading an application software, and for doing maintenance of hardware, etc. To address the reduction in the costs, thin client technology has been proposed.

FIG. 20 illustrates an explanatory diagram of a conventional thin client system. As illustrated in FIG. 20, a server 200 is coupled to a client personal computer (PC) 100 through Network Interface Cards (NIC) 110 and 120 that are communication units. The client PC 100 simply includes a keyboard, a mouse, a display, that is, a Video Graphics Array (VGA) display, a Central Processing Unit (CPU), and a memory. After the server 200 performs processing, the processing results by the server 200 are displayed on the client PC 100.

In the thin client system, the operation information in the client PC 100 is sent to the server 200 through the NIC 110 and 120. The server 200 includes a CPU, a memory, and a disk device. The server 200 executes a certain application, processes the operation information, and sends back the processing results to the client PC 100. The processing results sent from the server 200 are displayed on the client PC 100. The server 200 may be a real server or a server of a guest OS that is divided by a virtual machine.

In the thin client system, the client PC 100 is provided with the CPU and the memory because the keyboard, the mouse, the VGA display, and the NIC 110 in the client PC are generally processed. However, additional processing is performed little if not zero, so that a high-performance CPU and memory are not generally employed in the client PC.

Due to the thin client system, such additional processing is performed little if not zero, so that the install, update, or the like of application software to the client PC 100 may be omitted and a power-thrifty PC may be employed as the client PC 100. In addition, leakage of information may be reduced if not prevented because the client PC 100 does not hold data.

In the virtual machine system, the server (that is, a real machine system) 200 includes a virtual machine monitor (virtualization software), a host Operating System (OS), and two or more guest OS. The host OS is provided to manage the guest OS. The virtual machine monitor controls the host OS and the guest OS by virtualization technology.

The related systems are discussed as followed:

Patent Document 1, Japanese Patent Application Laid-open Publication No. 2008-052407 (for example, as illustrated in FIGS. 1 to 7 in the Publication);

Patent Document 2, Japanese Patent Application Laid-open Publication No. 11-134117; and Non-Patent Document 1, "Thin client", Incept Inc., Web site, Nov. 18, 1999, URL: http://e-words.jp/w/E382B7E383B3E382AFE383A9E382A4E382A2E383B3E 38388.html, searched on Aug. 24, 2009.

In the conventional configuration, the thin client system may employ a power-thrifty PC, causing energy savings as a whole. However, in the conventional thin client system, the client PC generally includes the CPU and the memory because the processing capability to process the keyboard, the mouse, the VGA display, and the NIC 110 operations is desired in the client PC.

In the electricity consumption of the PC, it is generally said that the CPU consumes about 30% of the total electricity and the power source consumes about 40% of the total electricity. Thus the energy saving in the PC may be limited and the further reduction in the electricity consumption of the PC may be difficult. In addition, in the thin client system using two or more client PC in the office, etc., each of the client PC generally includes the CPU and memory, so that further cost reduction may be difficult.

SUMMARY

In view of the foregoing, according to an embodiment of the present invention, a client system, a client control method, and a computer-readable recording medium is configured to store a client control program that uses the virtual machine and that may perform the energy saving in the PC using the virtualization technology.

A client system using a virtual machine includes: a physical server that includes a CPU, a memory, a bus, and a plurality of bus adapters, manages a plurality of guest OS by a host OS, and operates as a virtual machine; and a plurality of input and output units that are coupled to the plurality of bus adapters of the physical server respectively. The host OS of the physical server includes a configuration definition table that stores identification numbers, in the bus components and corresponding to the plurality of guest OS, of the input and output units using the guest OS, and the host OS notifies the guest OS corresponding to the input unit of input instruction information from the input units with reference to the configuration definition table and outputs a processing result of the guest OS to the output unit corresponding to the guest OS.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 5 illustrates an explanatory diagram of a guest OS configuration definition table in FIG. 3;

DESCRIPTION OF EMBODIMENTS

The embodiments are described below in the order of a client system using a virtual machine, client processing by the virtual machine, processing of the virtual machine and another embodiment. However, the client system is not limited to the embodiments.

[The Client System Using the Virtual Machine]

Figure 1:
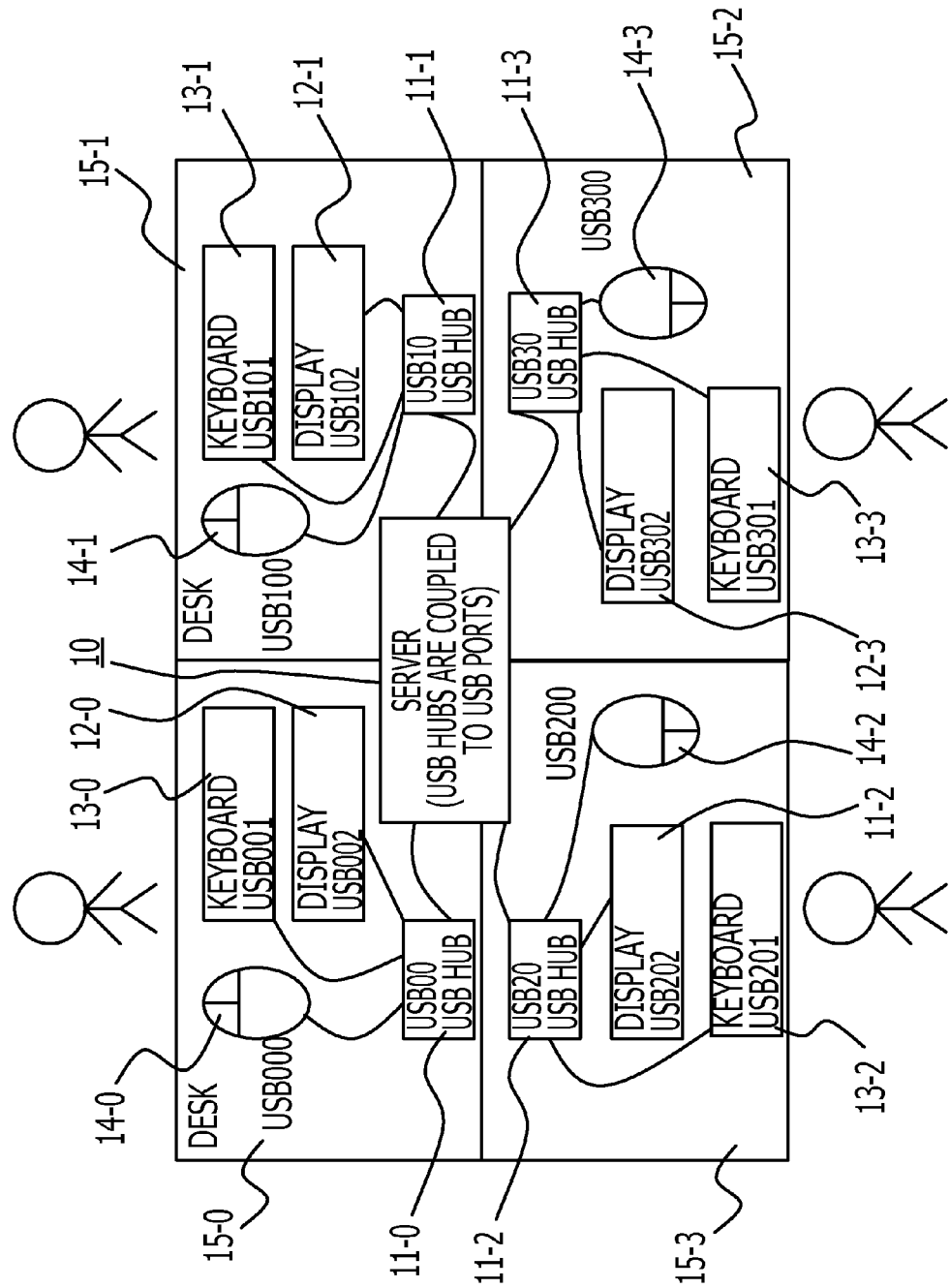
FIG. 1 illustrates a physical block diagram according to an embodiment in a client system.
Figure 2:
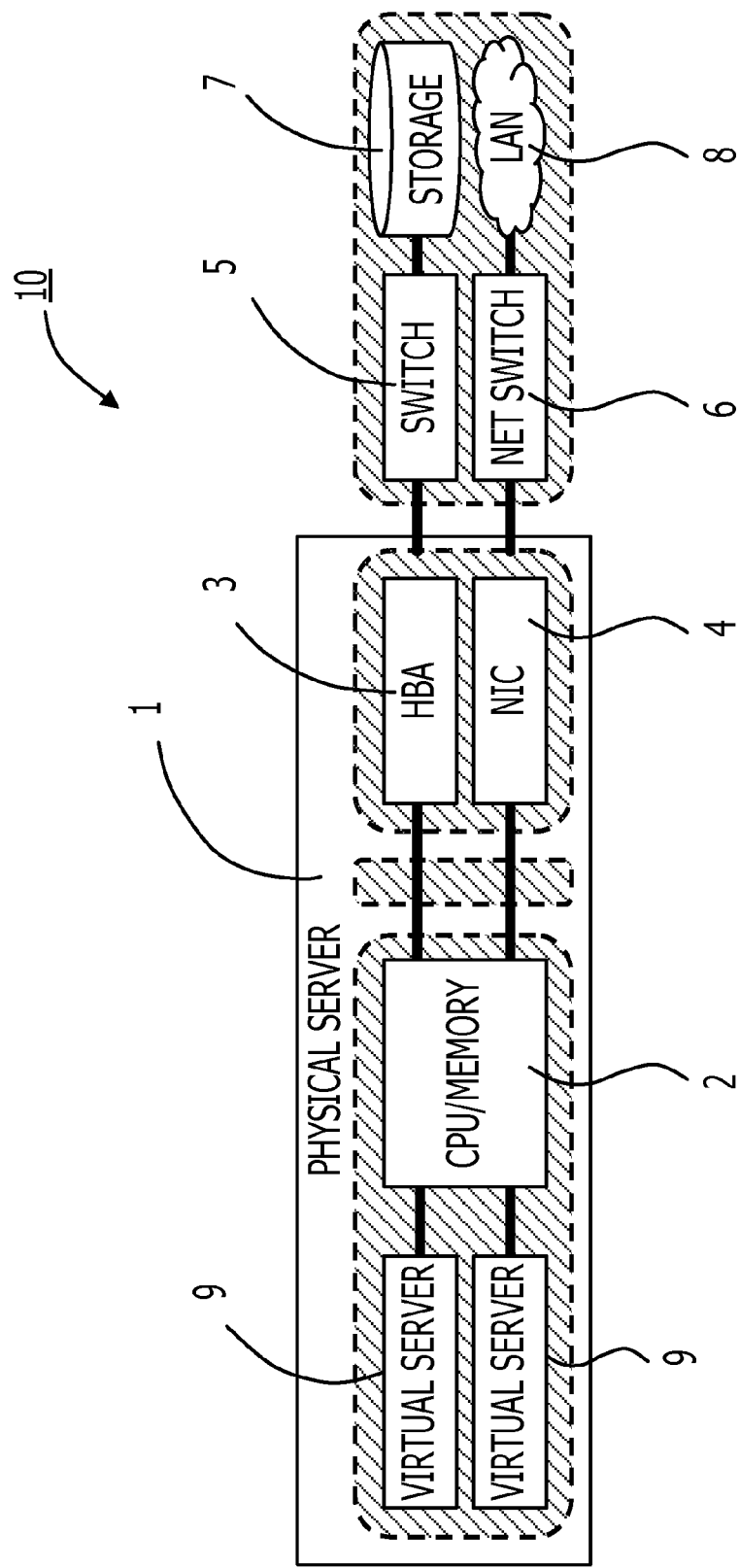
FIG. 2 illustrates a physical block diagram according to an embodiment of a server in the client system of FIG. 1.
Figure 3:
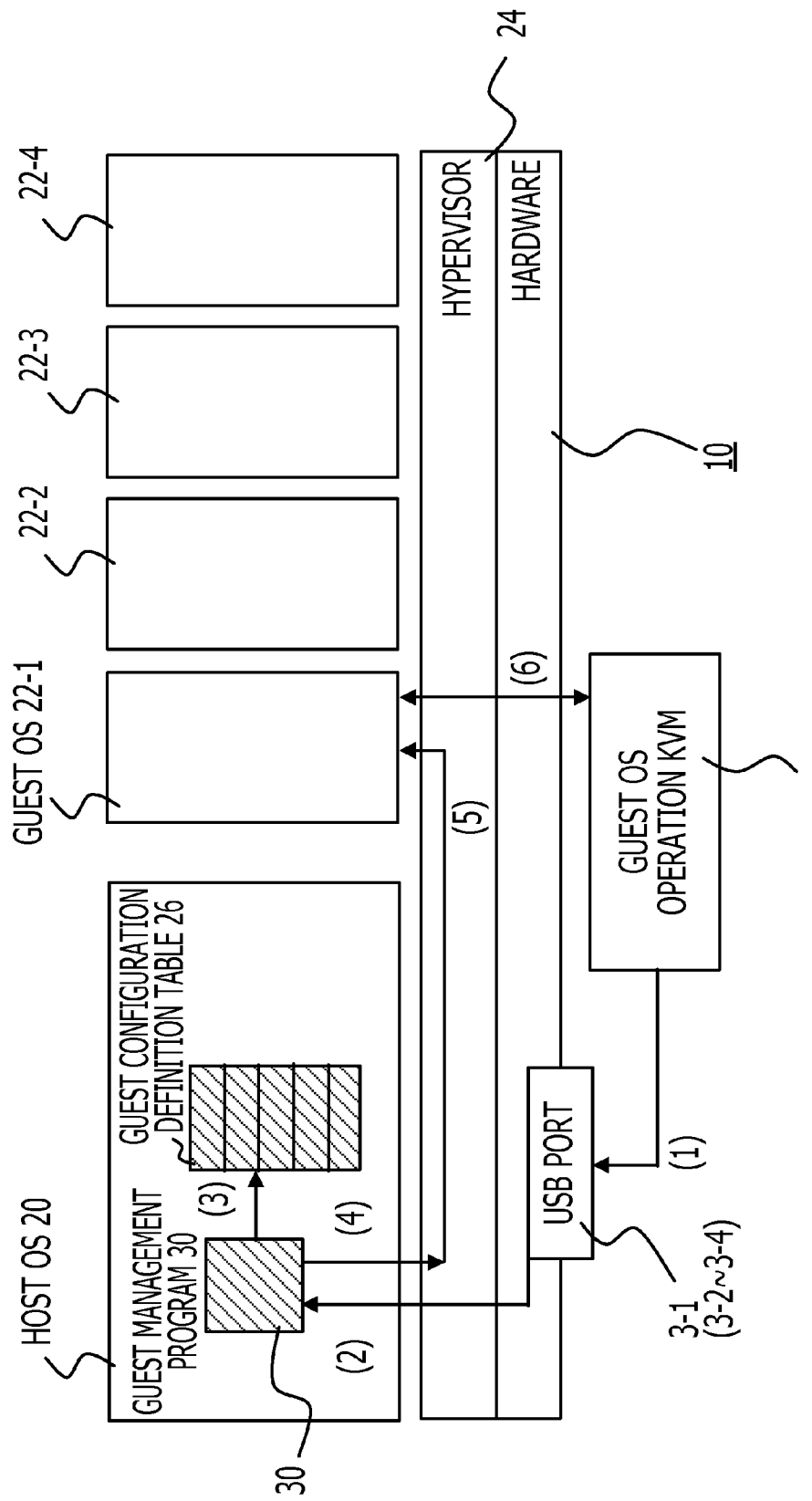
FIG. 3 illustrates a functional block diagram of software in a virtual machine system in FIGS. 1 and 2.
Figure 4:
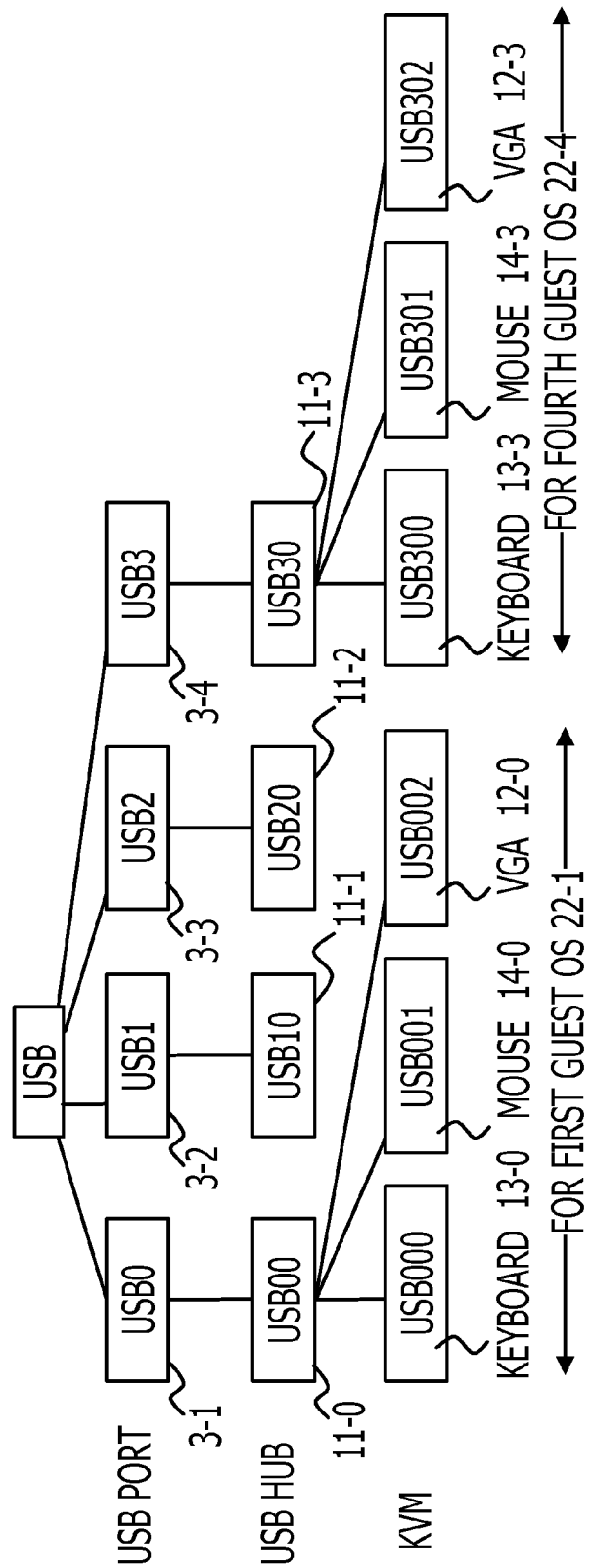
FIG. 4 illustrates an explanatory diagram of a connection configuration in the client in FIGS. 1 to 3.

FIG. 1 illustrates a physical block diagram according to an embodiment in a client system. FIG. 2 illustrates a physical block diagram according to an embodiment of a server in the client system of FIG. 1. FIG. 3 illustrates a functional block diagram of software in a virtual machine system in FIGS. 1 and 2. FIG. 4 illustrates an explanatory diagram of a connection configuration in the client in FIGS. 1 to 3. FIG. 5 illustrates an explanatory diagram of a guest OS configuration definition table in FIG. 3.

As illustrated in FIG. 1, a physical server 10 may include two or more Universal Serial Bus (USB) ports (for example, four USB ports in FIG. 1). Two or more desks (for example, four desks in FIGS. 1) 15-0 to 15-3 may be provided with mouses 14-0 to 14-3, keyboards 13-0 to 13-3, and displays (VGA displays) 12-0 to 12-3 respectively.

The USB port in the physical server 10 is coupled to at least one of two or more USB hubs (for example, four USB hubs in FIGS. 1) 11-0 to 11-3. The USB hubs 11-0 to 11-3 are coupled to any type of corresponding USB input/output devices, for example, mouses 14-0 to 14-3, keyboards 13-0 to 13-3, and VGA displays 12-0 to 12-3 respectively.

Each of the mouses 14-0 to 14-3, keyboards 13-0 to 13-3, and VGA displays 12-0 to 12-3 operate as the USB device of the physical server 10. In this case, the mouses, keyboards, and VGA displays are coupled to the physical server 10 through the USB hubs respectively as illustrated in FIG. 1 because the number of USB ports of the physical server 10 is limited. However, the USB hubs may be omitted when there are enough USB ports available in the physical server 10 or when the number of clients coupled to the physical server 10 is small.

The USB devices are provided with USB identification numbers (for example, "USB XXX" as illustrated in FIG. 1), and a tree indicating a connection configuration among the USB components is created as illustrated in FIG. 4.

The physical server 10 is described below with reference to FIG. 2. As illustrated in FIG. 2, the physical server 10 includes a real machine 1 and peripheral devices 5 to 7. The real machine 1 employs one or more CPU/memories 2, a Host Bus Adapter (HBA) 3 including a USB controller, and a Network Interface Card (NIC) 4 as hardware.

The HBA 3 is coupled to the storage device 7 (for example, a disk device) through the switch 5 (hereinafter also referred to as a Fibre Channel (FC) switch). The NIC 4 is coupled to Local Area Network (LAN) 8 through a net switch 6. The USB controller that is included in the HBA 3 and is coupled to USB ports 3-1 to 3-4 as illustrated in FIG. 3.

When virtualization software (Hypervisor) described in FIG. 3 is installed in a actual machine, the physical server 10 may function as two or more virtual servers 9 to the physical hardware. As illustrated in FIG. 3, for example, the virtualization software (Hypervisor) causes the CPU/memory 2 to function as the virtual server and causes the relationship between the physical server 10 and Input/Output (I/O) devices including the FC switch 5, the storage device 7, and the net switch 6 to virtualize.

The allocation and change of the I/O resources to the server, and the replacement of the server may be simplified by, for example, virtualization of the I/O adapter connection between the switch and the virtual machine, virtualization of address of the HBA 3 and NIC 4, and setting of the access right of the I/O devices including the FC switch 5, the storage device 7, and the net switch 6.

The virtualization software in the virtual machine (VM) system is described below with reference to FIG. 3. As illustrated in FIG. 3, the virtual machine monitor (Hypervisor) 24 is included in the layer where the whole VM system is controlled, and divides the physical resources such as the CPU/memory 2, the NIC 4, the net switch 6, the FC switch 5, and the storage device 7 into virtual resources. The virtual machine monitor 24 performs the allocation of the resource to each OS on the divided virtual resource basis, the dispatch of each of the OS, the emulation of privileged instructions executed by each of the OS, and the hardware control to the CPU. For example, VMware (trade name), Hyper V (trade name), Xen (trade name), or the like may be employed as the virtual machine monitor 24.

A host OS 20 functions as a domain OS, operates the whole VM system, and manages the guest OS 22-1 to 22-4. For example, the host OS 20 is started-up automatically when the VM system is booted, controls the startup/termination of the driver OS and the guest OS. The guest OS 22-1 to 22-4 are OS that are not provided with a real I/O in the VM configuration and may employ a known OS such as Linux (registered trademark) or Windows (registered trademark).

As illustrated in FIG. 3, the hardware (referred to as physical server in FIGS. 1 and 2) 10 includes the USB ports 3-1 to 3-4. The USB devices for guest operation include each of the mouses 14-0 to 14-3, the keyboards 13-0 to 13-3, and the VGA displays 12-0 to 12-3 respectively and are coupled to the USB ports 3-1 to 3-4 through the USB hubs 11-0 to 11-3 respectively.

The host OS 20 includes the guest OS configuration definition table 26 that associates the USB devices with the guest OS 22-1 to 22-4, and a guest management program 30 that controls the guest OS with reference to a guest OS configuration definition table 26.

The guest OS configuration definition table 26 and the guest management program 30 are described below with reference to FIGS. 4 and 5. The startup operation in the guest OS is performed using the keyboards 13-0 to 13-3 in each of the clients. In the real machine, the power of the machine is supplied when the power button of the PC is operated. In the VM system, the startup operation of the guest OS is generally operated from the host OS 20.

In the conventional connection configuration of the VM system, a network function is generally used because the login to the host OS is generally performed when the host OS is operated. Therefore, an OS function is desired for the use of the network function, causing the client to employ a CPU.

In the embodiment, the host OS 20 is provided with a function that associates USB tree with the guest OS, and is operated without including a CPU and an OS in the client. Thus, the host OS 20 manages which of the guest OS 22-1 to 22-4 is associated with a USB device and a guest OS operates in response to a USB device. According to an aspect of an embodiment, a device communication interface or specification, other than the USB specification can be used, that enables a host to interface with a device, which does not have processing (hardware and/or software) capabilities for executing functions to interface with a host OS, based upon a device number assigned to the device and an established data channel to the device.

That is to say, the USB tree is structured for enabling recognition of which guest OS being operated from a certain USB device such as the keyboard or mouse. As illustrated in FIG. 4, the USB tree indicates the connections among USB components and has a tree structure to couple the USB ports 3-1 to 3-4 to the USB hubs 11-0 to 11-3 to the USB devices including the keyboards 13-0 to 13-3, the mouses 14-0 to 14-3, the VGA displays 12-0 to 12-3 respectively. In the USB tree structure, "USB XXX" is illustrated as the USB identification numbers in FIG. 4.

The USB tree is associated with the guest OS. For example, the guest OS 22-1 is associated with a first USB tree to couple the USB port 3-1 to the USB hub 11-0 to the USB devices including the keyboard 13-0, the mouse 14-0, and the VGA display 12-0. In addition, the guest OS 22-4 is associated with a fourth USB tree to couple the USB port 3-4 to the USB hub 11-3 to the USB devices including the keyboard 13-3, the mouse 14-3, and the VGA display 12-3.

As illustrated in FIG. 5, the guest OS configuration definition table 26 stores a correspondence table that indicates the association of the USB ports with the guest OS. The correspondence table allows the host OS 20 to associate the I/O instruction information to/from the USB ports 3-1 to 3-4 with the guest OS 22-1 to 22-4 respectively.

For example, in FIG. 5, the guest OS configuration definition table 26 is, on the guest OS basis, provided with items such as a guest OS name, a guest OS operation/display USB device number, a guest OS startup key (described later), and a guest OS forcible termination key (described later). In FIG. 5, according to the FIG. 4, USB hub 11-0 "USB00", keyboard 13-0 (USB device) "USB000", mouse 14-0 (USB device) "USB001", and VGA display 12-0 (USB device) "USB002" are stored as items associated with a first guest OS 22-1 "guest_OS_001" in the guest OS configuration definition table 26.

The two or more guest OS may share the use of the USB hub. Another USB device such as an external USB memory in addition to the keyboard 13-0, the mouse 14-0, and the VGA display 12-0 may be associated with the guest OS because the USB device numbers are associated with the guest OS.

In the VM system, the startup of the guest OS is generally operated from the host OS 20. In addition, the startup of the guest OS by another person is desired to be prevented. That is, the startup of the guest OS by another person without permission when the person who owns the guest OS is away is desired to be prevented. Thus, in the VM system, an authentication of the association of an operator with a guest OS is desired.

Therefore, the host OS 20 includes a function that identifies the operator who has performed the startup operation of the guest OS as the operator allowed to operate the guest OS. Without the function, when the guest OS in a state of termination is operated with a certain keyboard by an operator, the operator may deliberately or accidentally start-up the guest OS that is even not owned by the operator, causing undesirably security vulnerability. In the embodiment, an authentication function for the startup of the guest OS may be employed.

In the embodiment, the authentication function is employed that causes the guest OS to start-up when the guest OS startup key that is set in the correspondence table of the guest OS configuration definition table 26 included in the host OS 20 coincides with the certain key (startup character string) inputted by the operator. In the example of FIG. 5, the certain startup character string to the first guest OS, e.g., guestOS1_act_key=guestOS1_PowerON_hooHOO (23 characters), is defined and stored in the guest OS startup key section of the guest configuration definition table 26.

When the defined startup character string has been inputted from the keyboard that is coupled to the USB port associated with a certain guest OS, the host OS 20 recognizes that the operator who has inputted the defined startup character string is entitled to the startup operation of the guest OS, and the host OS 20 starts-up the guest OS.

In the embodiment, the forcible termination of the guest OS is performed by guest OS operation KVM, that is, the keyboard 13-0, mouse 14-0, and VGA display 12-0. In the real machine, when an OS hangs-up and then a computer keyboard command such as "CTRL+ALT+DELETE" is denied, the power supply of the PC is cut by pressing and holding the power button down.

On the other hand, in the VM system, the forcible termination operation of the guest OS in addition to the startup operation is generally performed from the host OS 20. Thus, in the embodiment, the authentication function is employed that causes the guest OS to forcibly terminate when the guest OS forcible termination key that is set in the correspondence table of the guest OS configuration definition table 26 in the host OS 20 coincides with the certain key (forcible termination character string) inputted by the operator.

In the example of FIG. 5, the certain forcible termination character string to a given guest OS, e.g., guestOS1_poff_key=guestOS1_POFf_hooHOO (20 characters) is defined and stored in the guest OS forcible termination key section of the guest OS configuration definition table 26.

As with the above-described startup processing, when a defined forcible termination character string has been inputted from the keyboard that is coupled to the USB port associated with the guest OS, the host OS 20 forcibly terminates the guest OS. The similar method to the method of inputting the forcible termination character string may be applied to a dump sampling, that is a Non-maskable Interrupt (NMI) button in the real machine (see the website, http://ja.wikipedia.org/wiki/%E5%89%B2%E3%82%8A%E8%BE%BC%E3%81%BF), forcible reboot of the guest OS, or the like, in addition to the forcible termination of the guest OS.

Moreover, when an input operation from a keyboard or mouse is performed, the host OS identifies the guest OS associated with the keyboard or mouse used for the input operation with reference to the guest OS configuration definition table 26, and the input instruction information is processed by the identified guest OS. In addition, when a guest OS performs description on a VGA display, in the same way, the USB device to be used for the description is identified with reference to the guest OS configuration definition table 26, and the description is performed on the identified USB device.

The startup/termination and normal operational state of the guest OS are described with reference to FIG. 3.

(1) The request for the startup/termination of the guest OS 22-1 is performed by inputting the certain key from the guest OS operation keyboard 13-0.

(2) According to the request for the startup/termination from the guest OS operation keyboard 13-0, a keyboard interrupt from the USB port 3-1 occurs in the host 20, and the guest management program 30 in the host OS 20 accepts the request.

(3) The guest management program 30 in the host OS 20 determines whether or not that the USB port where the request for the startup/termination of the guest OS 22-1 is inputted and the inputted key are associated with the guest OS defined in the guest OS configuration definition table 26.

(4) When the host OS 20 determines that the USB port and the inputted key are associated with the defined guest OS, the request for the startup/termination of the guest OS 22-1 is notified to the virtual machine monitor (Hypervisor) 24.

(5) The virtual machine monitor (Hypervisor) 24 performs the startup/termination of the guest OS 22-1 according to the notification from the host OS 20.

(6) The guest OS 22-1 is operated from the guest OS operation KVM, that is, the keyboard 13-0, mouse 14-0, and VGA display 12-0 after the startup of the guest OS 22-1.

As described above, the input units including the keyboard and mouse and the VGA display are coupled to the USB ports of the physical server 10 as USB devices, and the server 10 includes a virtual machine. The guest OS may be operated by using each of the input units/VGA displays in the server 10 because the host OS 20 identifies the guest OS associated with each of the input units/VGA displays. Thus, a client PC may be used by a user without a CPU and memory, causing the energy saving of the client PC.

In addition, a function to associate the USB tree with the guest OS is included in the host OS 20, so that the connection of the USB devices with the virtual server may be performed simply by adding guest OS control processing without remodeling the guest OS and the virtual machine monitor. As a result, the host OS are generally performed with a CPU/memory, while the client PC may be performed without the CPU/memory. Moreover, the guest OS may be applied to the client system without limitation of the kind of the guest OS because the guest OS is employed without modification in the client system.

Each of the guest OS is generally provided with a keyboard, a mouse, and a display. That is, the guest OS may be performed without a CPU, a memory, a hard disk, and an installed OS that are included in the client of the conventional thin client system. As a result, the client PC that is low price and saves electric power may be applied to the client system according to the embodiment.

In the client system, the user may use the similar functions to the functions in the real machine such as the forcible termination, the dump sampling, and the reboot because the operations that may be performed in the real machine may be defined in the host OS 20.

In the configuration of the client system, the function that identifies the operator allowed to operate the guest OS is included in the host OS 20, so that the security vulnerability may be reduced if not prevented.

In addition, in the client system, the function that starts-up and forcibly terminates the guest OS is included in the host OS 20, so that the user may execute an application utilizing the guest OS without awareness of the processing of the host OS 20.

In the client system, the USB tree is associated with the guest OS in the host OS 20, so that functions that causes the guest OS to process the input instruction information from the keyboard and mouse and displays the VGA output from the guest OS on the desired display are included in the system. As a result, the user may execute an application utilizing the guest OS without awareness of the processing of the host OS 20.

[The Client Processing by the Virtual Machine]

Figure 6:
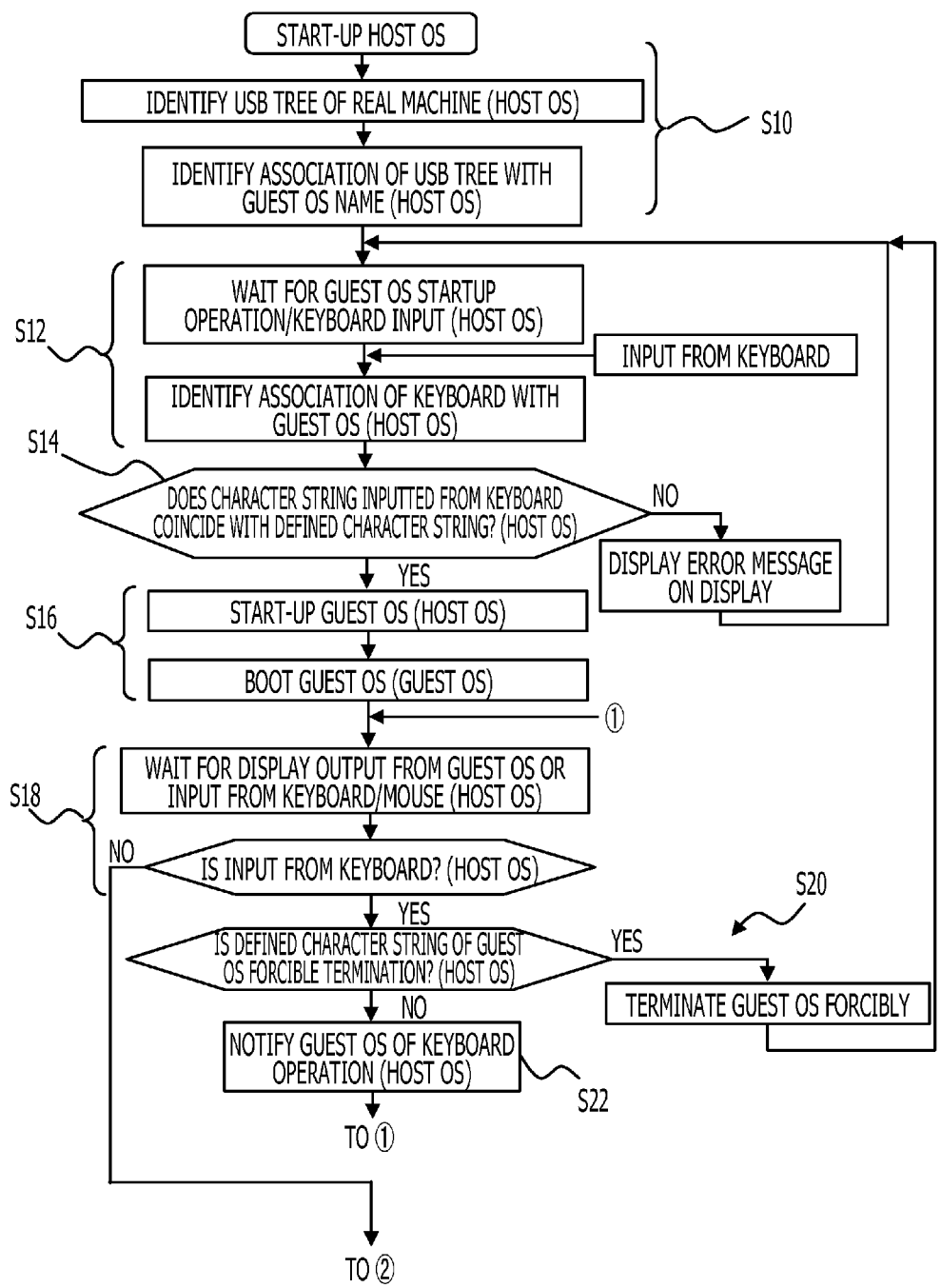
FIG. 6 illustrates a flowchart of processing of a guest OS management program in a host OS according to an embodiment.
Figure 7:
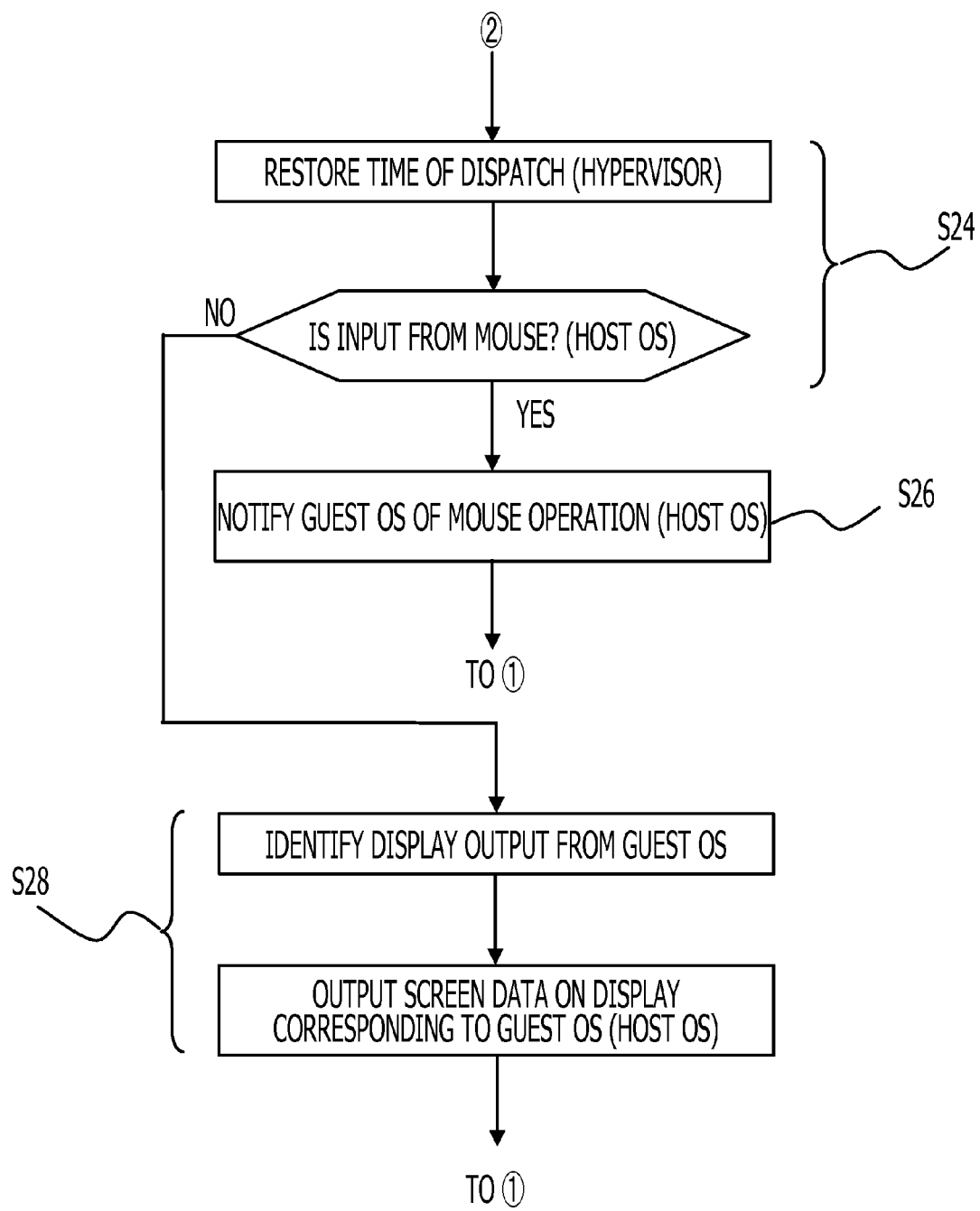
FIG. 7 illustrates a flowchart of processing of a guest OS management program in a host OS according to the embodiment.
Figure 8:
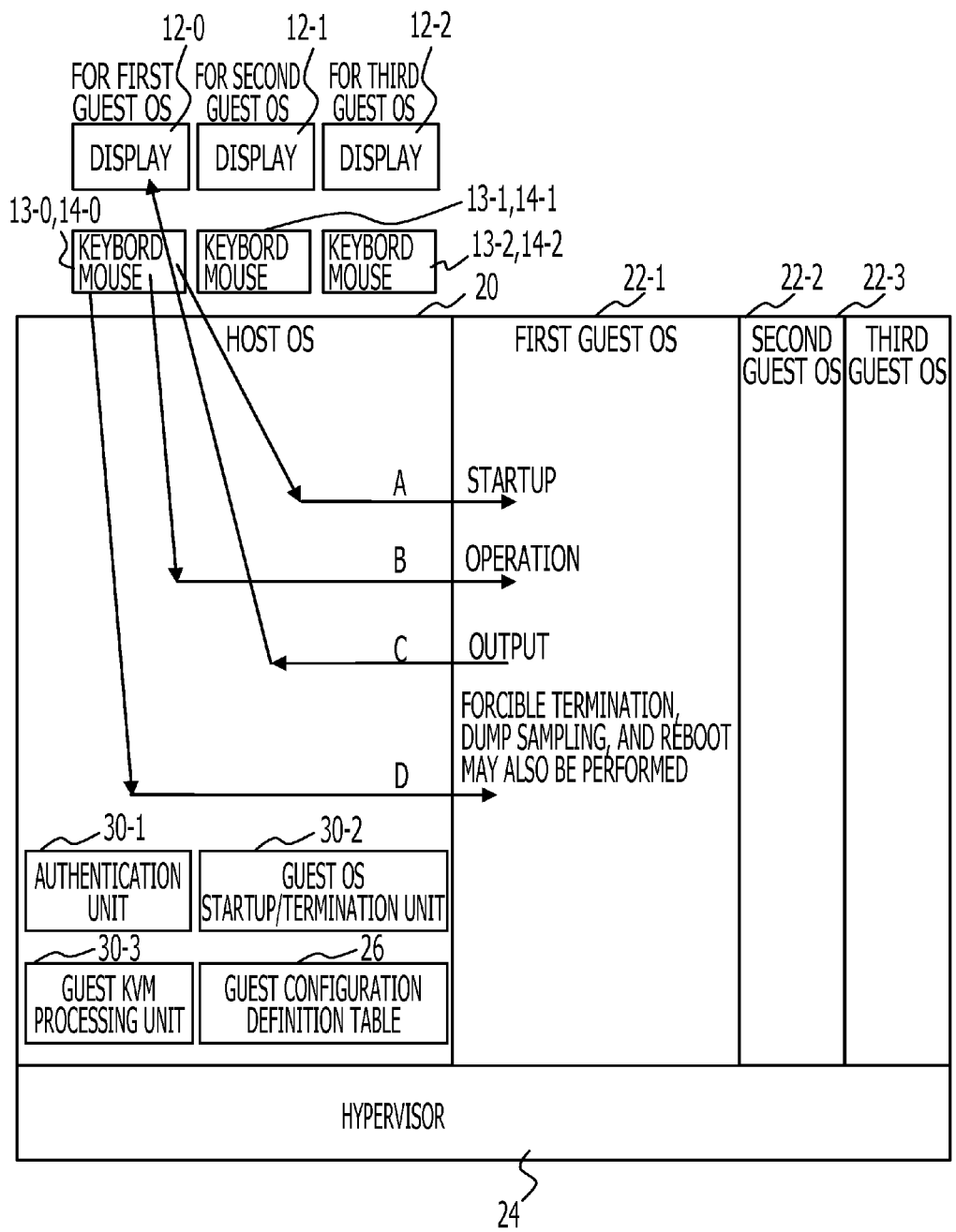
FIG. 8 illustrates an explanatory diagram of operations of guest OS management processing.

FIGS. 6 and 7 illustrate flowcharts of processing of a guest OS management program in a host OS according to an embodiment. FIG. 8 illustrates an explanatory diagram of operations of the guest OS management processing.

Management operations of the guest OS management program in the host OS 20 in FIGS. 6 and 7 is described below with reference to the FIG. 8.

(Operation S10)

When the host OS 20 is started-up, the host OS 20 identifies the USB tree of the real machine. That is, the host OS 20 obtains each of the numbers of the USB devices that have connections among the USB tree, compares the numbers with the contents registered in the guest OS configuration definition table 26, and identifies each of the USB devices that have connections among the USB tree. In addition, the host OS 20 manages the association of the USB devices with the corresponding guest OS respectively with reference to the association of the USB tree in the guest OS configuration definition table 26 with the corresponding guest OS after identifying each of the USB devices.

(Operation S12)

The host OS 20 waits for the guest OS startup operation from the keyboard. When the host OS 20 accepts the input from the keyboard through the USB port, the host OS 20 refers to the guest OS configuration definition table 26 with the USB number of the keyboard where the input operation has been performed, and identifies the guest OS corresponding to the keyboard.

(Operation S14)

The host OS 20 determines that whether or not the character string inputted from the keyboard coincides with the startup key defined by the guest OS in the guest OS configuration definition table 26, and identifies the startup operation by the operator allowed to operate the guest OS based on the determined result. When the inputted character string does not coincide with the startup key, the host OS 20 displays an error message on the display corresponding to the keyboard and the flow returns to Operation S12.

(Operation S16)

When the character string inputted from the keyboard coincides with the defined startup key in the guest configuration definition table 26, the host OS 20 causes the guest OS 22-1 that has been successfully authenticated to start-up through the virtual machine monitor 24 as illustrated by arrow A in FIG. 8. The guest OS boots and starts-up.

(Operation S18)

The host OS 20 waits for a display output from the guest OS or an input from a keyboard or mouse. When the host OS 20 accepts the input, the host OS 20 determines that whether or not the input is operated from a keyboard based on the USB number of the USB device where the input operation has been performed. When the input is not operated from a keyboard, the flow proceeds to Operation S24 in FIG. 7.

(Operation S20)

When the host OS 20 determines that the input is operated from a keyboard, the host OS 20 determines that the character string inputted from the keyboard coincides with the forcible termination key that is defined by the guest OS and stored in the guest OS configuration definition table 26. When the host OS 20 determines that the inputted character string coincides with the forcible termination key, the host OS 20 causes the guest OS corresponding to the forcible termination key to terminate forcibly as illustrated by arrow D in FIG. 8. After that the flow returns to Operation S12.

(Operation S22)

When the host OS 20 determines that the inputted character string does not coincide with the forcible termination key, the host OS 20 notifies the guest OS 22-1 corresponding to the keyboard where the character string has been inputted of the keyboard instruction information through the virtual machine monitor 24 as illustrated by arrow B in FIG. 8. After that, the flow returns to Operation S18.

(Operation S24)

When the host OS 20 determines the input is not operated from a keyboard in Operation S18, the virtual machine monitor 24 restores the time of dispatch. After that, the host OS 20 determines whether or not the input is operated from a mouse based on the USB number of the USB device that has accepted the input. When the host OS 20 determines that the input is not operated from a mouse, the flow proceeds to Operation S28.

(Operation S26)

When the host OS 20 determines that the input is operated from a mouse, the host OS 20 notifies the guest OS 22-1 corresponding to the mouse that has been operated of the mouse instruction information through the virtual machine monitor 24 as illustrated by arrow B in FIG. 8. After that, the flow returns to Operation S18.

(Operation S28)

When the host OS 20 determines that the input is not operated from a mouse, the host OS 20 identifies the display output from the guest OS. After that, the host OS 20 outputs screen data on a physical display corresponding to the guest OS as illustrated by arrow C in FIG. 8, and the flow returns to Operation S18.

The host OS 20 notifies the guest OS of the keyboard or mouse input instruction information with reference to the guest OS configuration definition table 26 to cause the guest OS to process the keyboard or mouse input instruction information.

The client system according to the embodiment may be performed simply by employing a certain host OS without modification of the guest OS or the virtual machine monitor because the host OS 20 is provided with the guest management program 30 including an authentication unit 30-1, a guest OS startup/termination unit 30-2, and a guest KVM processing unit 30-3, and the guest OS configuration definition table 26 as described above. In addition, the guest OS may be applied to the client system without limitation of the kind of the guest OS because the guest OS is employed without modification in the client system.

[The Processing of the Virtual Machine]

Figure 9:
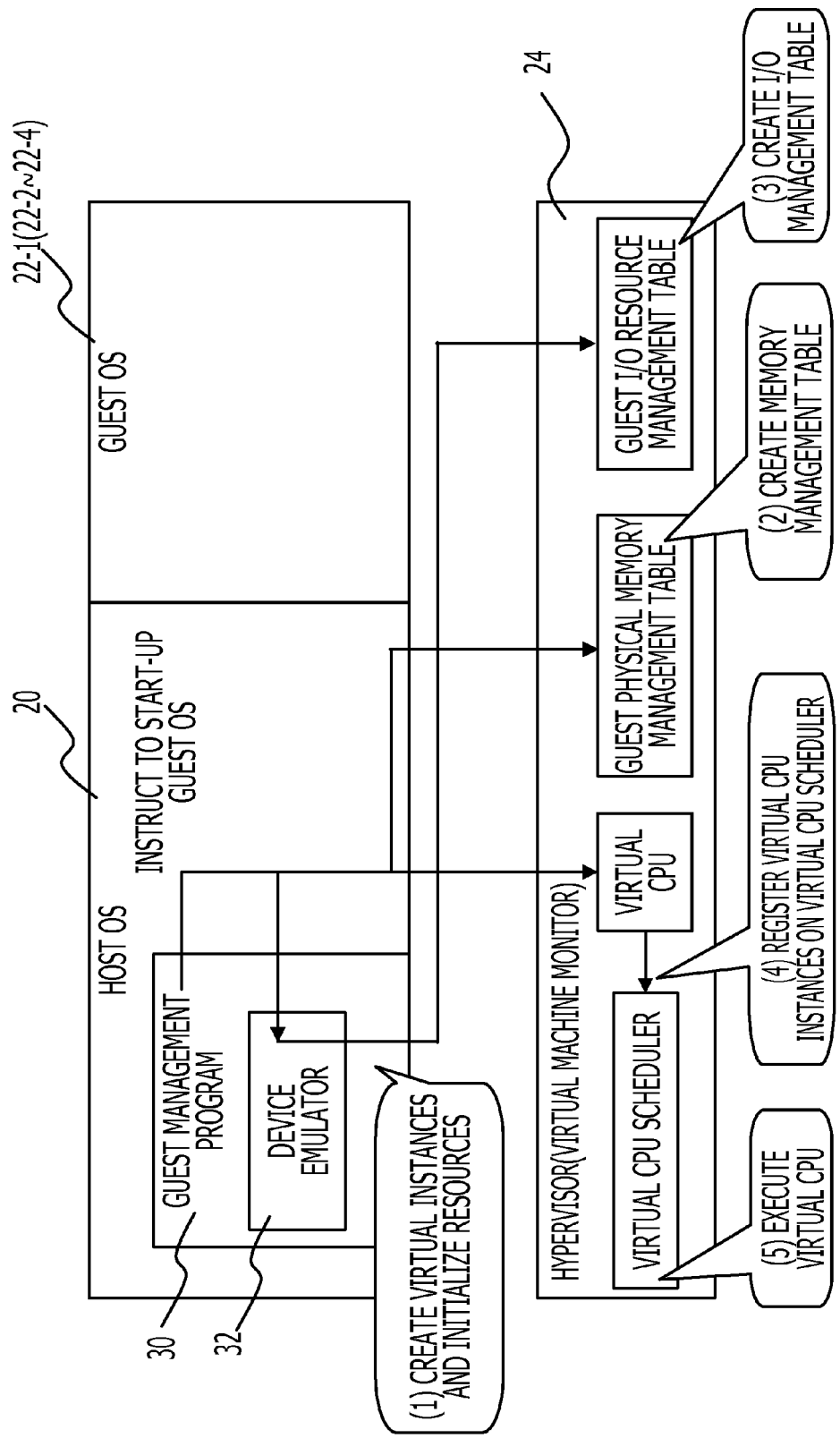
FIG. 9 illustrates an explanatory diagram of startup processing of a guest OS according to the embodiment.
Figure 10:
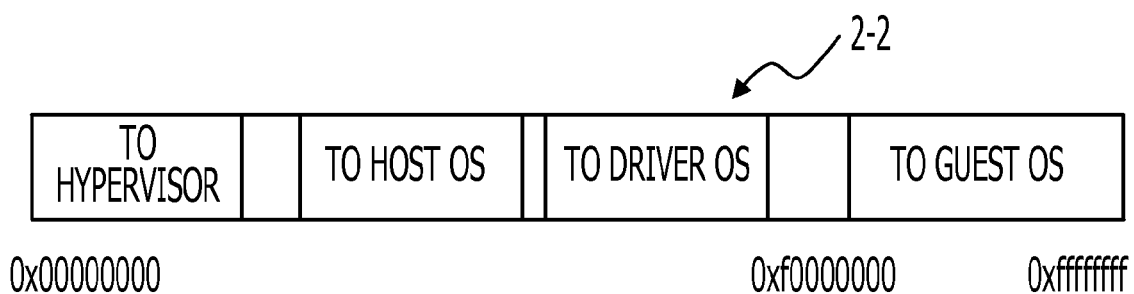
FIG. 10 illustrates an explanatory diagram of the allocation of a physical memory in FIG. 9.
Figure 11:
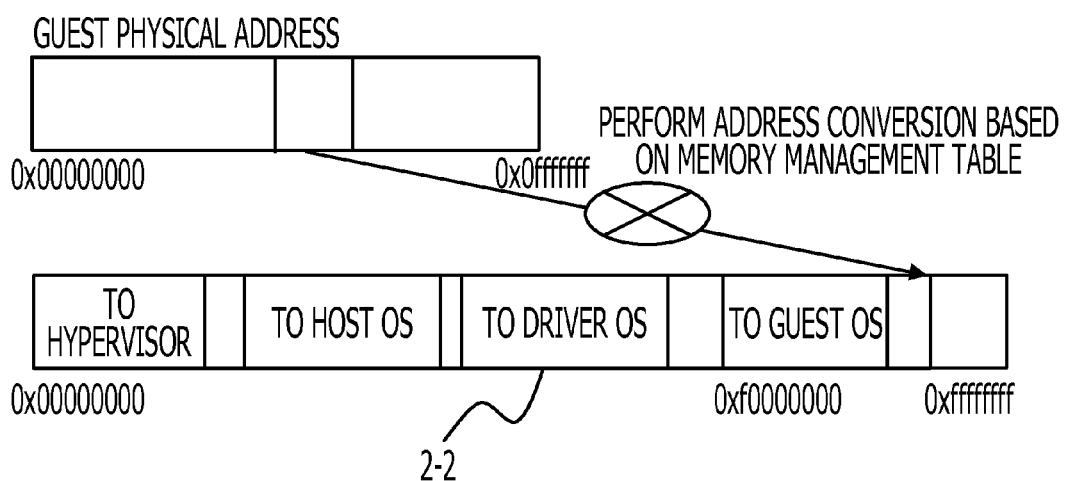
FIG. 11 illustrates an explanatory diagram of the address conversion between a real physical address and a guest physical address in FIG. 10.
Figure 12:
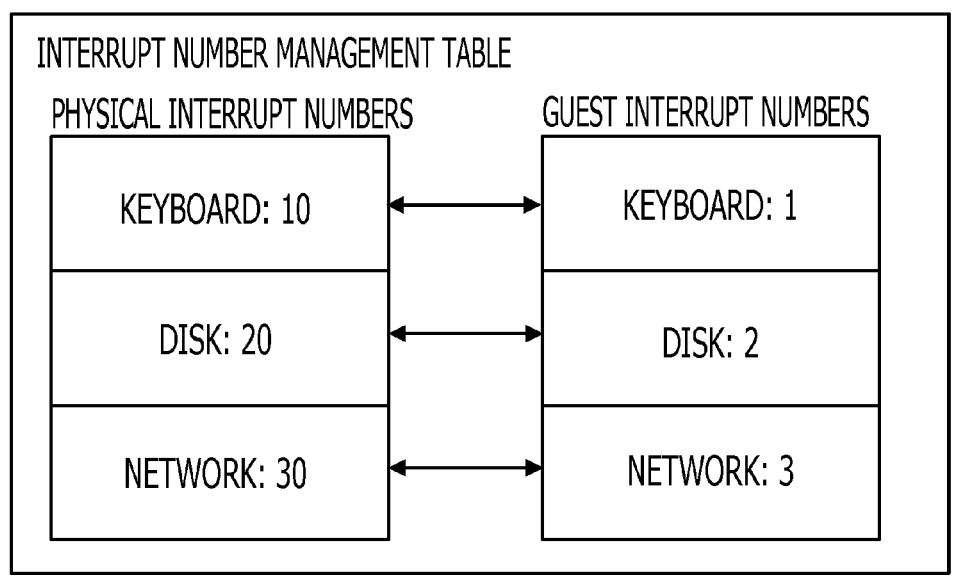
FIG. 12 illustrates an explanatory diagram of an interrupt number management table according to a first embodiment in the I/O resource allocation in FIG. 9.
Figure 13:
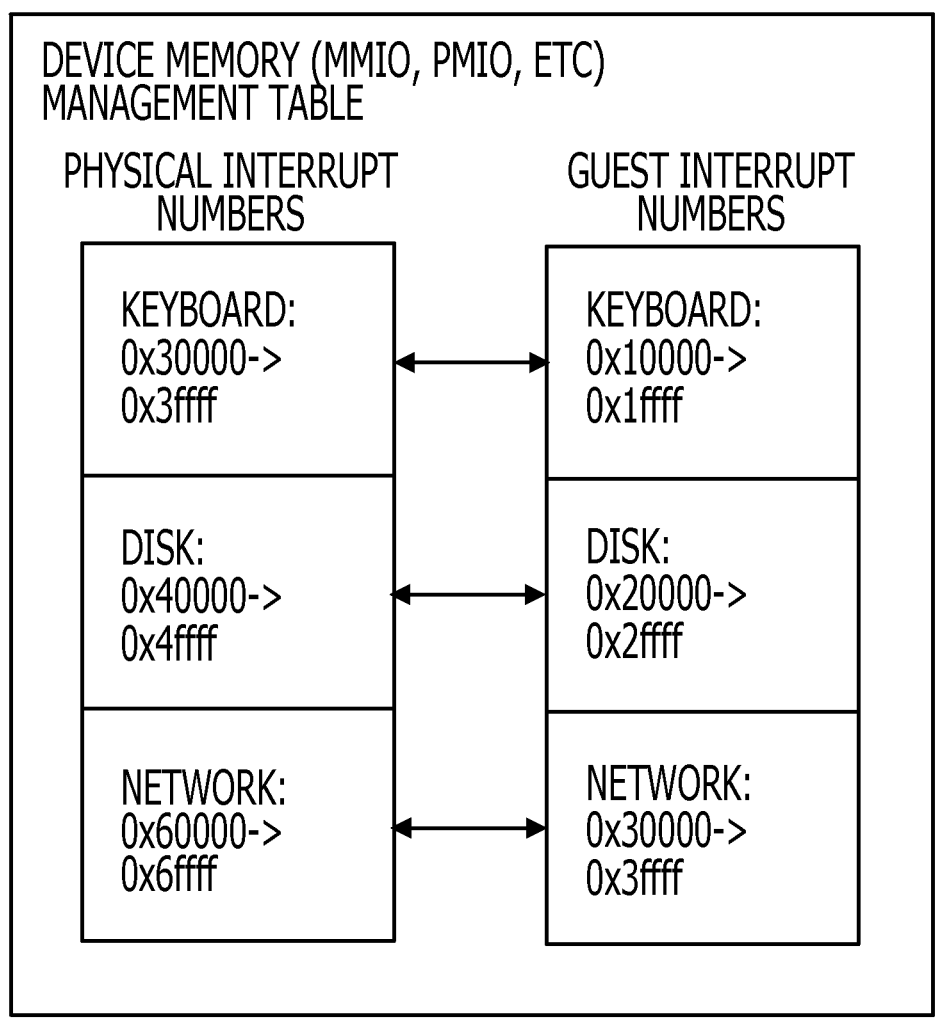
FIG. 13 illustrates an explanatory diagram of a device memory management table according to the first embodiment in the I/O resource allocation in FIG. 9.
Figure 14:
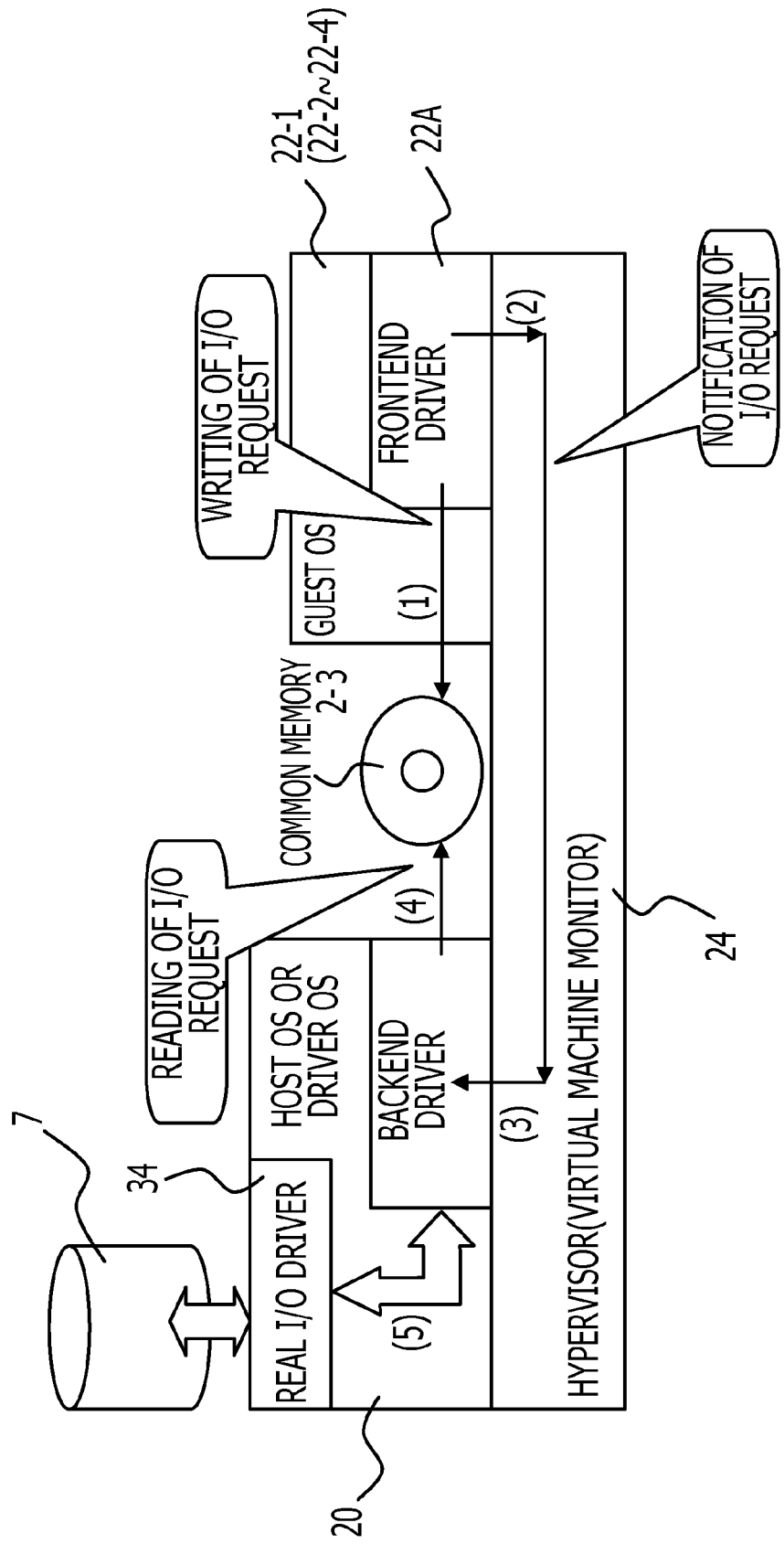
FIG. 14 illustrates an explanatory diagram according to a second embodiment in the I/O resource allocation in FIG. 9.
Figure 15:
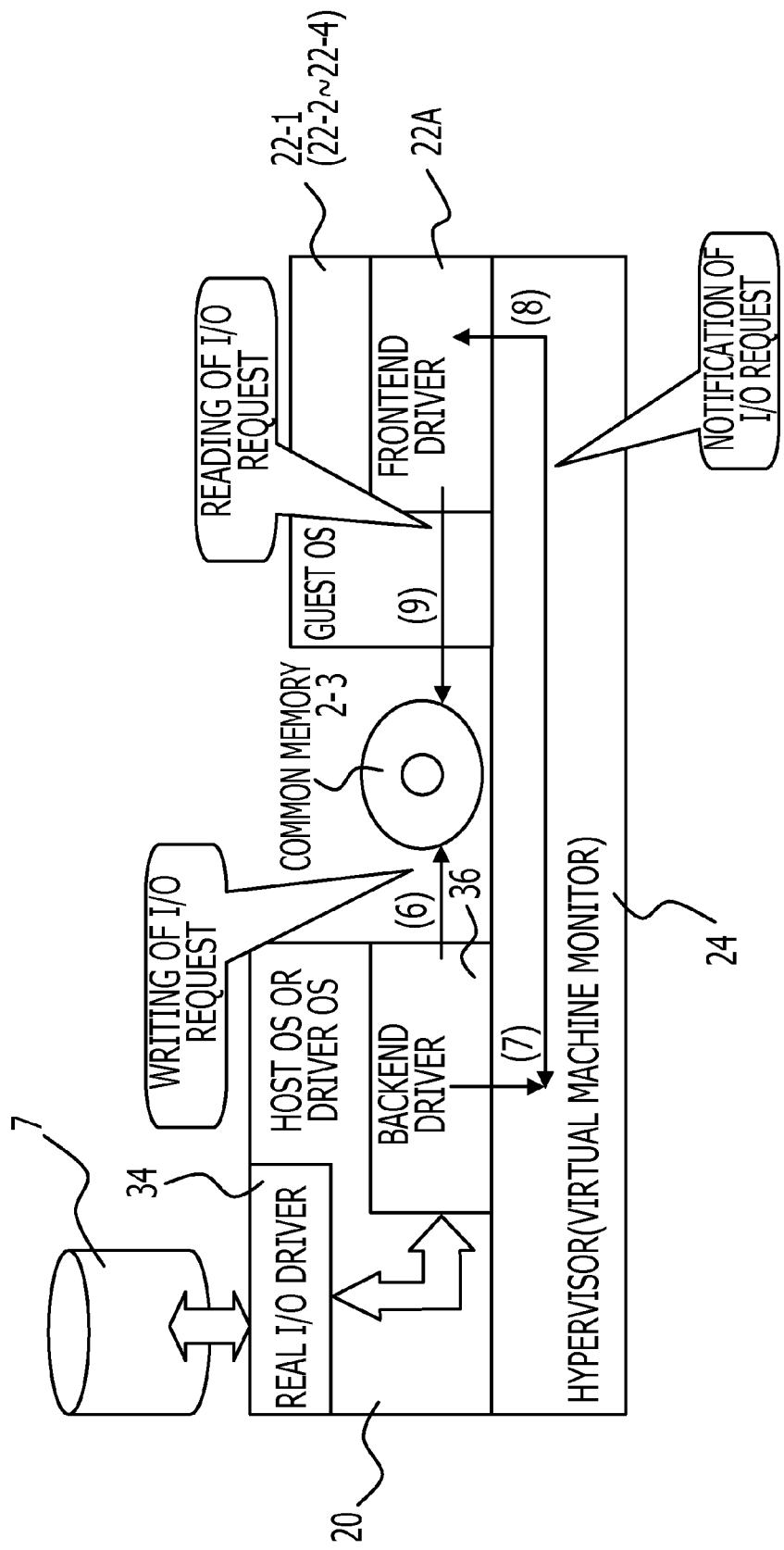
FIG. 15 illustrates another explanatory diagram according to the second embodiment in the I/O resource allocation in FIG. 9.
Figure 16:
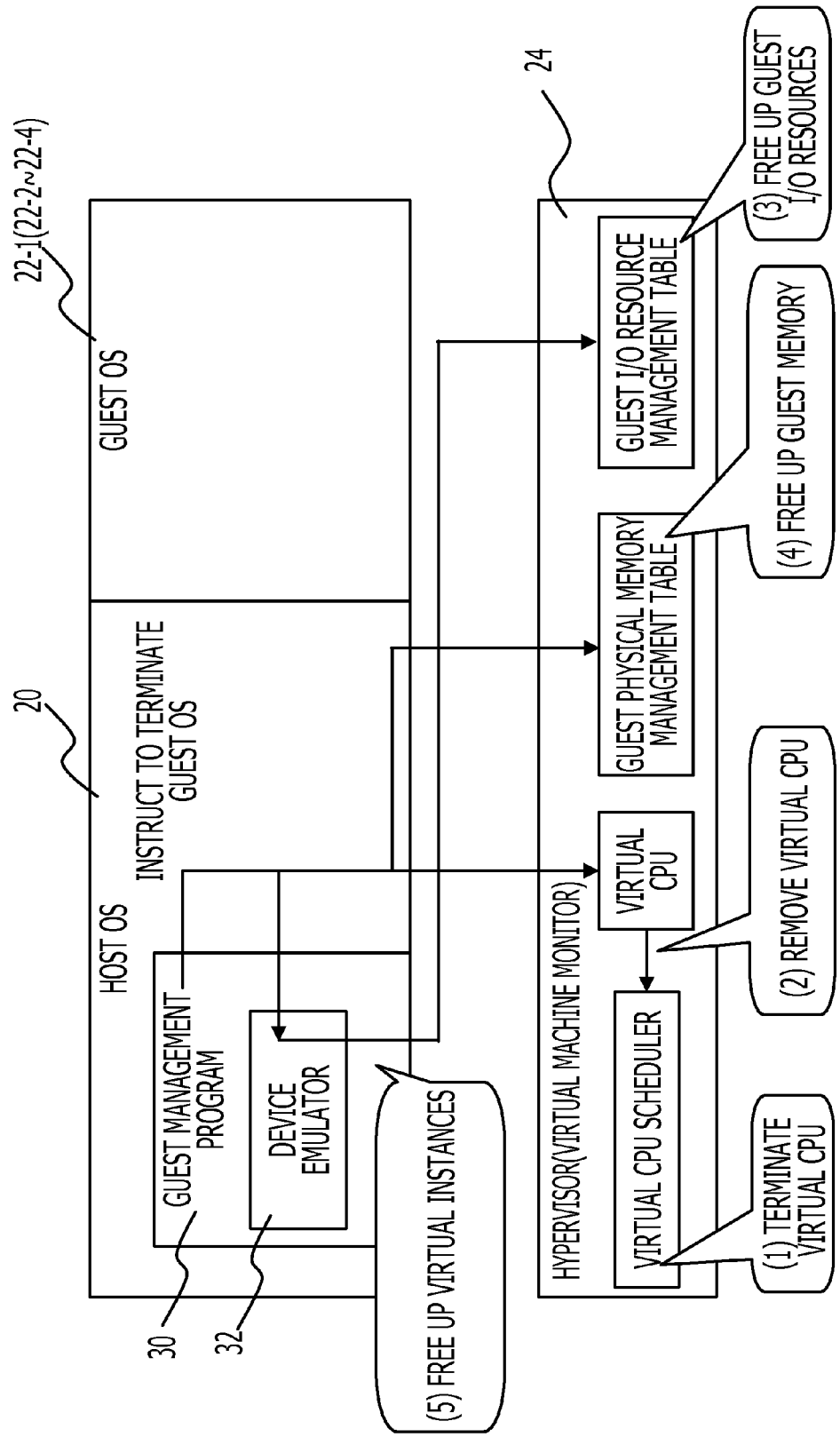
FIG. 16 illustrates an explanatory diagram of termination processing of the guest OS according to the embodiment.

The processing of the virtual machine is described below. FIG. 9 illustrates an explanatory diagram of startup processing of the guest OS according to the embodiment. FIG. 10 illustrates an explanatory diagram of the allocation of the physical memory in FIG. 9. FIG. 11 illustrates an explanatory diagram of the address conversion between the real physical address and the guest physical address in FIG. 10. FIGS. 12 and 13 illustrate explanatory diagrams according to a first embodiment in the I/O resource allocation in FIG. 9. FIGS. 14 and 15 illustrate explanatory diagrams according to a second embodiment in the I/O resource allocation in FIG. 9. FIG. 16 illustrates an explanatory diagram of termination processing of the guest OS according to the embodiment.

The startup processing of the guest OS is described with reference to FIG. 9.

(1) When the startup of the guest OS is instructed from the host OS 20, a device emulator 32 creates the virtual machine instances (a virtual CPU, a guest physical memory, a virtual device, etc.) and initializes each resource.

(2) The virtual machine monitor 24 creates a memory management table to associate a guest physical memory with a real physical memory as described in FIGS. 10 and 11 later.

(3) In addition, the virtual machine monitor 24 creates an I/O management table to associate a guest physical I/O with a real physical I/O as described in FIGS. 12 to 15 later.

(4) The virtual machine monitor 24 registers a virtual CPU on a virtual CPU scheduler.

(5) The virtual machine monitor 24 registers the virtual CPU instances created in "Operation (1)" on the virtual CPU scheduler and executes the virtual CPU within the virtual machine monitor 24.

The allocation of the physical memory for creating the memory management table is described with reference to FIGS. 10 and 11. When the host OS 20 and a driver OS (described later) are provided, the virtual machine monitor 24 manages a physical memory space 2-2 allocated to the driver OS and the guest OS and controls a memory access that is performed by each of the driver OS and guest OS. For example, as illustrated in FIG. 10, the virtual machine monitor 24 allocates the physical memory space 2-2 to the virtual machine monitor, the host OS 20, the driver OS, and the guest OS.

The guest OS specifies a guest physical address and performs the memory access. As illustrated in FIG. 11, the virtual machine monitor 24 converts the guest physical address into the real physical address and performs the actual memory access. The virtual machine monitor 24 creates the memory management table to perform such address conversion.

The guest OS may operate within the memory space allocated by the virtual machine monitor 24. The virtual machine monitor 24 may operate within the memory space allocated to the virtual machine monitor. In addition, the virtual machine monitor 24 may be allowed to access other memory spaces.

The host OS 20 and the driver OS may access certain memory spaces when the virtual machine monitor 24 allows the access.

The allocation of the I/O resources in the I/O management table is described with reference to FIGS. 12 to 15. I/O access methods are as followed:

(1) A method of utilizing a driver that is used when a regular OS controls physical hardware, on the guest OS.

(2) A method of controlling physical hardware using a certain protocol between the guest OS and the host OS 20 or the guest OS and the driver OS, that is, a method of using frontend and backend drivers.

In the case of the method (1), when the I/O access is performed, the guest OS performs hardware access by utilizing a guest I/O resource. The virtual machine monitor 24 converts the guest I/O resource into a real physical I/O resource and performs the actual hardware access. FIG. 12 illustrates an interrupt number management table that associates guest interrupt numbers (numbers of a keyboard, a disk, network, and the like) with physical interrupt numbers (physical numbers of the keyboard, the disk, the network, and the like). FIG. 13 illustrates a device memory (Memory-mapped I/O (MMIO), Port-mapped I/O (PMIO), etc.) management table that associates guest interrupt numbers (numbers of memories/registers of a keyboard, a disk, network, and the like) with physical interrupt numbers (physical numbers of the memories/registers of the keyboard, the disk, the network, and the like).

When the I/O access is performed, the guest OS converts the numbers mutually among the created I/O management table that associates the guest interrupt numbers with the physical interrupt numbers and performs the hardware access utilizing the guest I/O resources.

The method (2) that uses the frontend and backend drivers is described below. As illustrated in FIGS. 14 and 15, the virtual machine monitor 24 provides, as I/O resource, a common memory 2-3 where an I/O request is written and a mechanism that notifies the I/O request and includes event numbers and a notification interface.

The guest OS 22-1 in FIG. 14 uses not a driver that performs regular hardware access but a driver 22A that is referred to as "frontend" and is specialized for a guest OS. A backend driver 36 of the host OS 20 processes the request from the frontend driver 22A and operates a real I/O driver (program) 34.

The processing of the frontend driver 22A and the backend driver 36 in I/O issuance operations is described with reference to FIGS. 14 and 15.

(1) As illustrated in FIG. 14, the guest OS 22-1 writes the I/O requests into the common memory 2-3 in the I/O issuance operations.

(2) The guest OS 22-1 performs an I/O issuance notification to the virtual machine monitor 24.

(3) The virtual machine monitor 24 performs the I/O issuance notification to the host OS 20 or the driver OS.

(4) The host OS 20 or the driver OS receives the I/O issuance notification and refers to the contents of the common memory 2-3.

(5) The host OS 20 or the driver OS issues a real I/O according to the contents of the common memory 2-3.

(6) As illustrated in FIG. 15, the host OS 20 or the driver OS writes the result of the real I/O into the common memory 2-3.

(7) The host OS 20 or the driver OS performs an I/O completion notification to the virtual machine monitor 24.

(8) The virtual machine monitor 24 performs the I/O completion notification to the guest OS 22-1.

(9) The guest OS 22-1 receives the result of I/O from the common memory 2-3 after reception of the I/O completion notification from the virtual machine monitor 24.

The termination processing in the guest OS is described with reference to FIG. 16.

(1) When the virtual machine monitor 24 receives an instruction for the termination of the guest OS from the host OS 20, the virtual CPU is terminated in the virtual machine monitor 24.

(2) The virtual CPU that is terminated in Operation (1) is removed from a virtual CPU scheduler in the virtual machine monitor 24

(3) The virtual devices are freed up and the I/O management table that associates the guest I/O with the real physical I/O is freed up.

(4) The guest physical memory (see FIG. 10) is freed up and the memory management table that associates the guest physical memory with the real physical memory is freed up.

(5) The virtual machine instances (the virtual CPU, etc.) are freed up by the device emulator 32 of the host OS 20.

Thus, the startup/termination of the guest OS, the memory access, and the I/O access are performed in the virtual machine.

[Another Embodiment]

Figure 17:
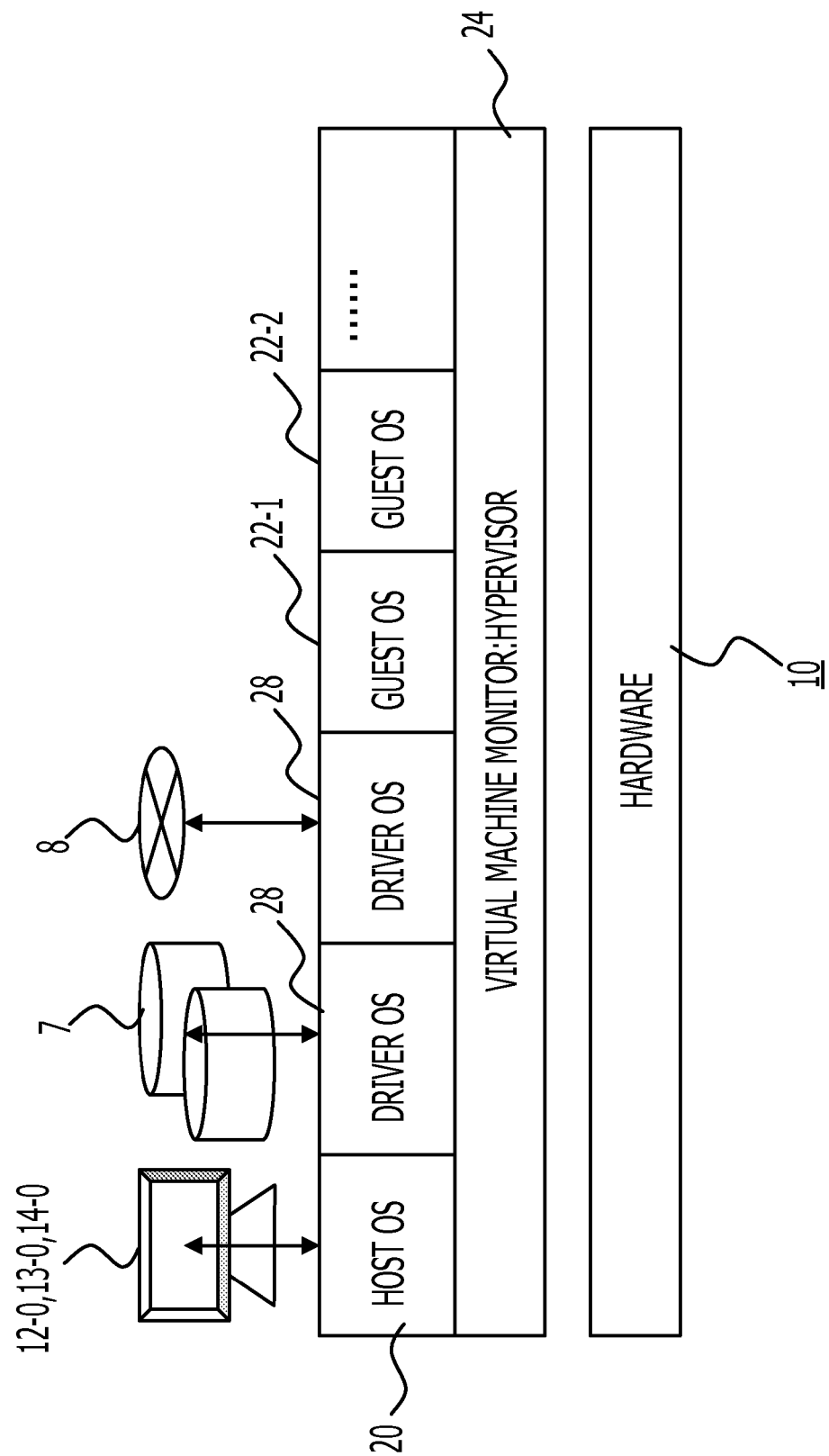
FIG. 17 illustrates a functional block diagram of software in a virtual machine system according to another embodiment.
Figure 18:
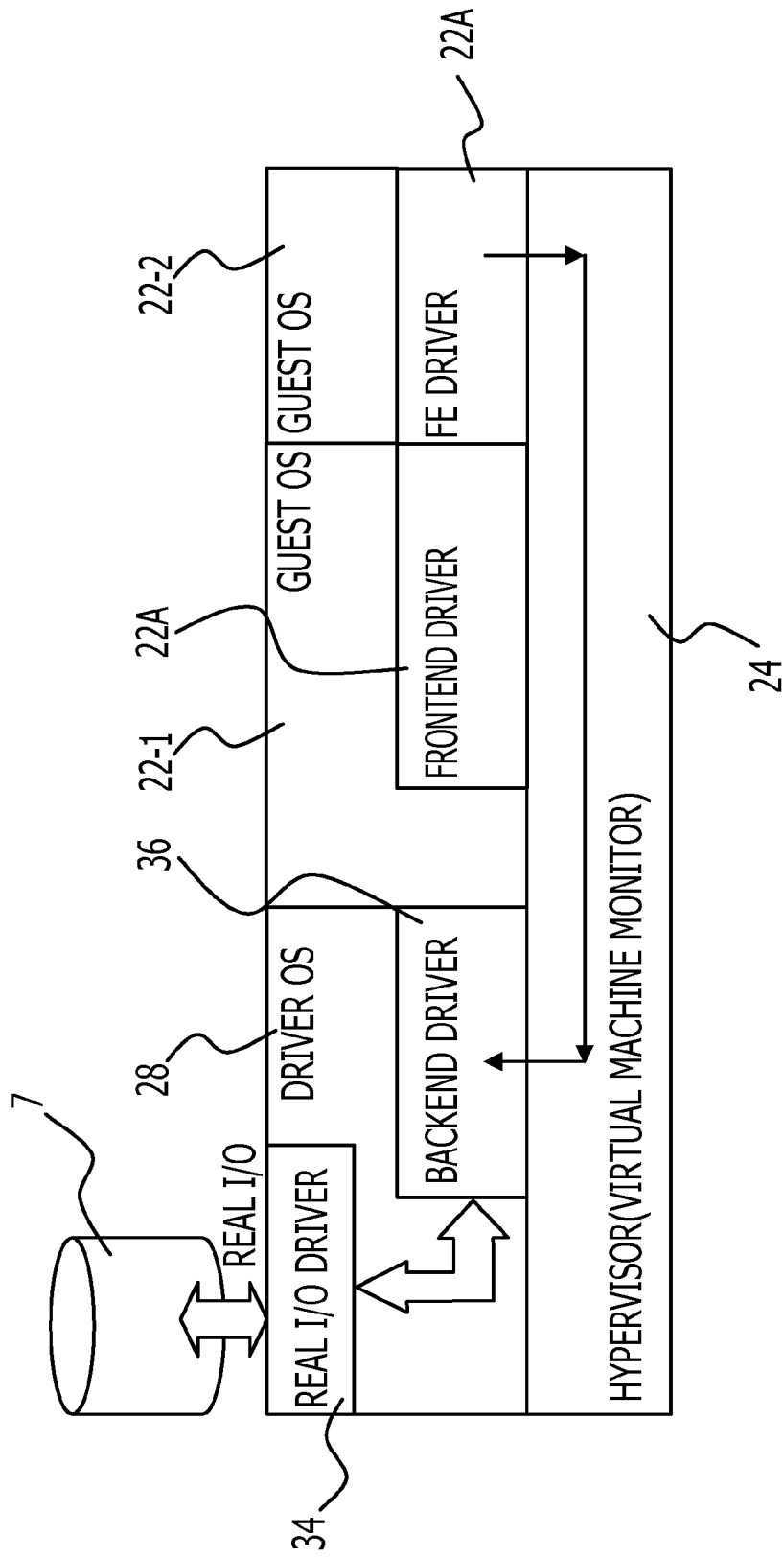
FIG. 18 illustrates an explanatory diagram of the I/O operations in FIG. 17.

FIG. 17 illustrates a functional block diagram of software in a virtual machine system according to another embodiment. FIG. 18 illustrates an explanatory diagram of a driver OS and the guest OS in FIG. 17.

In the foregoing embodiment, the host OS that includes the driver function is described. On the other hand, in another embodiment, a driver OS 28 that controls an I/O device as well as a host OS 20 is provided as illustrated in FIG. 17. The driver 28 performs real I/O control. Each guest OS 22-1 to 22-4 may perform I/O when each of the guest OS asks the driver OS 28 to perform the I/O The driver OS 28 may operate on the host OS 20 and the guest OS 22-1 as well. When the driver OS 28 operates on a guest OS, the corresponding guest OS functions as the driver OS 28. In FIG. 17, a storage device 7 and network 8 such as a LAN in FIG. 2 are provided with the driver OS 28 respectively, and the host OS 20 drives guest OS operation KVM, that is, a keyboard 13-0, a mouse 14-0, and a VGA display 12-0.

As illustrated in FIG. 18, each of the guest OS 22-1 to 22-4 includes a frontend driver 22A, and the driver OS 28 includes a backend driver 36. As illustrated in FIGS. 9 to 15, the frontend driver 22A and the backend driver 36 perform I/O data transfer operations between the guest OS 22-1 and the driver OS 28. In addition, the guest OS operation KVM, that is, the keyboard 13-0, mouse 14-0, and VGA display 12-0 may be provided with the driver OS 28 respectively.

The load of the host OS 20 may be reduce and high-speed operational environment may be provided because the driver OS is utilized in the embodiment.

Figure 19:
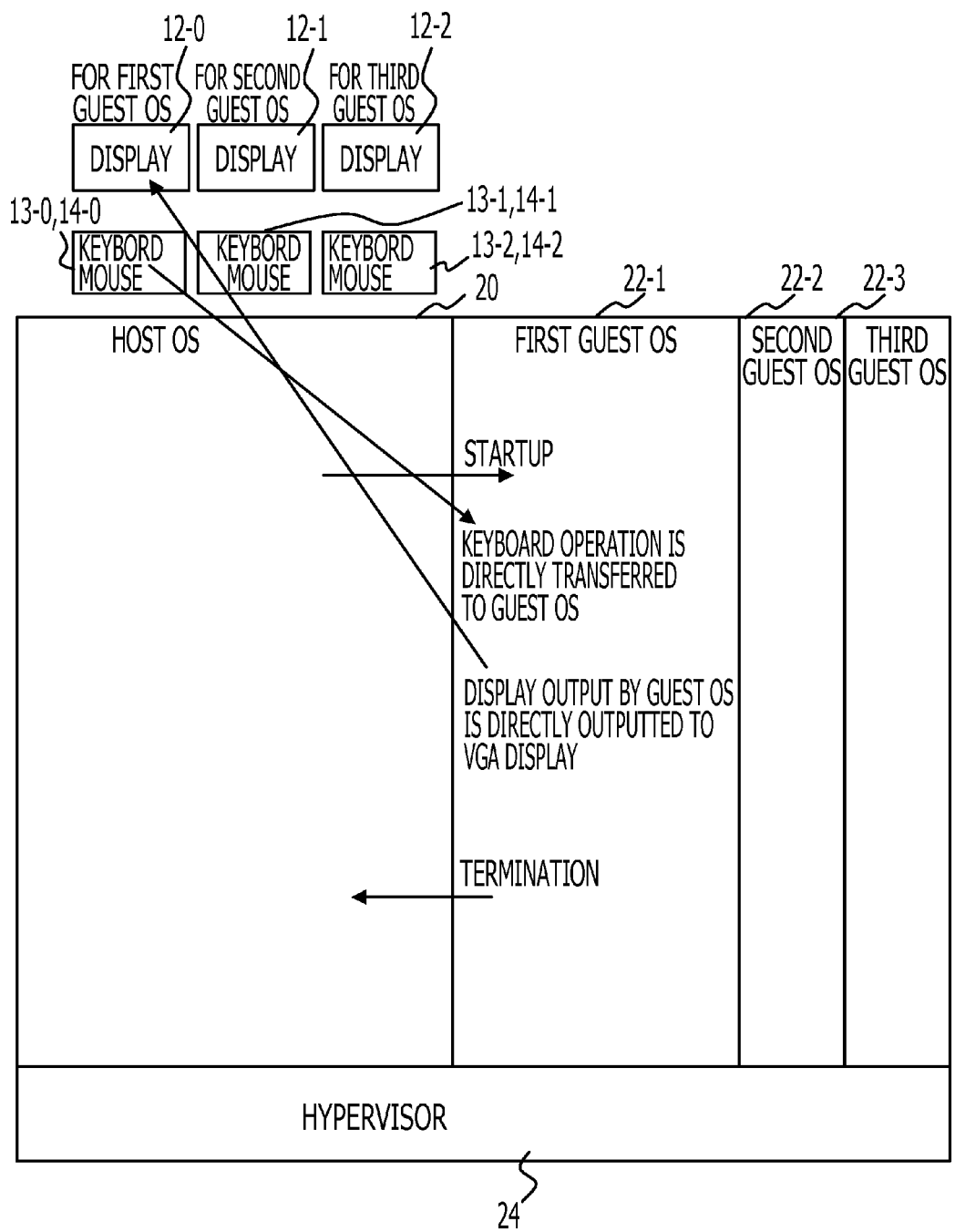
FIG. 19 illustrates an explanatory diagram of a virtual machine according to another embodiment.
Figure 20:
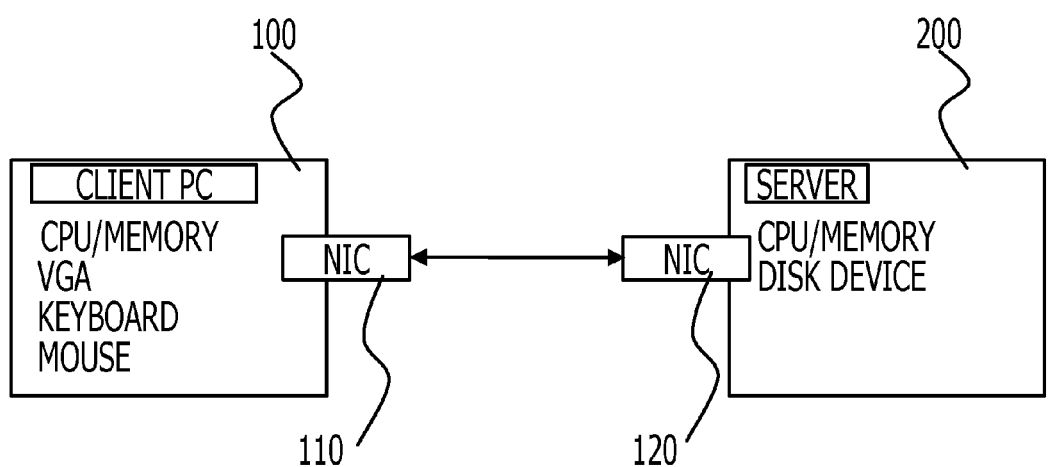
FIG. 20 illustrates an explanatory diagram of a conventional client system.

FIG. 19 illustrates an explanatory diagram of a virtual machine according to another embodiment. In FIG. 19, composing elements the same as FIG. 8 are denoted with a same symbol. In FIG. 19, the corresponding guest OS startup/termination processing with the authentication function using the keyboards 13-0 to 13-2 are similar processing to the processing illustrated in FIGS. 6 to 8, and description of the processing is omitted herein.

In the embodiment of FIG. 19, the input/output operations are performed directly by the guest OS with the displays 12-0 to 12-2, the keyboards 13-0 to 13-2, and the mouses 14-0 to 14-2. Such method replaces a hardware resource function of the virtual machine monitor 24 with not software but a CPU or a chipset, and is referred to as "Virtualization Technology for Directed I/O (VT-d)." The detail description of the VT-d is omitted herein because the detail description of the VT-d on internet, URL: http://www.atmarkit.co.jp/fsys/kaisetsu/085intelvt/intelvt.html, has been known.

The function (chipset) allows the virtual machine to reduce the occurrence of overhead and to perform in higher-speed operational environment.

The bus adapter is described with the USB controller, the USB port, and the USB hub above. Alternatively, another bus adapter such as a Peripheral Component Interface bus (PCI) may be employed.

According to an aspect of the embodiments of the invention, any combinations of one or more of the described features, functions, operations, and/or benefits can be provided. A combination can be one or a plurality. The embodiments can be implemented as an apparatus (a machine) that includes computing hardware (i.e., computing apparatus), such as (in a non-limiting example) any computer that can store, retrieve, process and/or output data and/or communicate (network) with other computers. According to an aspect of an embodiment, the described features, functions, operations, and/or benefits can be implemented by and/or use computing hardware and/or software. The apparatus can comprise a controller (CPU) (e.g., a hardware logic circuitry based computer processor that processes or executes instructions, namely software/program), computer readable media, transmission communication interface (network interface), and/or an output device, for example, a display device, all in communication through a data communication bus. In addition, an apparatus can include one or more apparatuses in computer network communication with each other or other apparatuses. In addition, a computer processor can include one or more computer processors in one or more apparatuses or any combinations of one or more computer processors and/or apparatuses. An aspect of an embodiment relates to causing one or more apparatuses and/or computer processors to execute the described operations. The results produced can be output to an output device, for example, displayed on the display.

A program/software implementing the embodiments may be recorded on a computer-readable media, e.g., a non-transitory or persistent computer-readable medium. Examples of the non-transitory computer-readable media include a magnetic recording apparatus, an optical disk, a magneto-optical disk, and/or volatile and/or non-volatile semiconductor memory (for example, RAM, ROM, etc.). Examples of the magnetic recording apparatus include a hard disk device (HDD), a flexible disk (FD), and a magnetic tape (MT). Examples of the optical disk include a DVD (Digital Versatile Disc), DVD-ROM, DVD-RAM (DVD-Random Access Memory), BD (Blue-ray Disk), a CD-ROM (Compact Disc-Read Only Memory), and a CD-R (Recordable)/RW. The program/software implementing the embodiments may be transmitted over a transmission communication path, e.g., a wire and/or a wireless network implemented via hardware. An example of communication media via which the program/software may be sent includes, for example, a carrier-wave signal.

The invention has been described with reference to the embodiments, but many modifications may be made without departing from the spirit and scope of the invention. Accordingly, these modifications are considered to be within the scope of the invention.

Although the embodiments of the present invention are numbered with, for example, "first," "second," or "third," the ordinal numbers do not imply priorities of the embodiment. Many other variations and modifications will be apparent to those skilled in the art.

All examples and conditional language recited herein are intended for pedagogical purposes to aid the reader in understanding the aspects of the invention and the concepts contributed by the inventor to furthering the art, and are to be construed as being without limitation to such specifically recited examples and conditions, nor does the organization of such examples in the specification relate to a showing of the superiority and inferiority of the aspects of the invention. Although the embodiment in accordance with aspects of the present invention has been described in detail, it should be understood that various changes, substitutions, and alterations could be made hereto without departing from the spirit and scope of the invention.

Moreover, the term "or" is intended to mean an inclusive "or" rather than an exclusive "or". That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

What is claimed is:

1. A computer system using a virtual machine for control by a client device comprising:
    a physical server that includes a CPU, a memory, a bus, and a plurality of bus adapters, includes a host operating system (OS) that manages a plurality of guest OSs, and the physical server operates as a virtual machine to cause a virtual machine monitor (VMM) to divide a physical resource including at least the CPU and the memory into virtual resources, and for the VMM to allocate the physical resource to the guest OSs on the divided virtual resource basis;
    a plurality of input units that are coupled to the plurality of bus adapters of the physical server respectively and are operable as client devices by users;
    a plurality of output units that are coupled to the plurality of bus adapters of the physical server respectively and are as client devices by users, wherein
    the host OS of the physical server includes a configuration definition table that stores identification numbers of the input and output units in correspondence with respective guest OSs used by the input and output units, and
    the host OS receives and notifies a guest OS of input instruction information from an input unit that corresponds to the guest OS with reference to the configuration definition table and receives and outputs a processing result of a guest OS to an output unit that corresponds to the guest OS with reference to the configuration definition table.

2. The computer system using a virtual machine according to claim 1, wherein:
    the host OS receives a startup character string from one of the input units, determines whether a certain character string registered in the configuration definition table coincides with the startup character string, and starts-up a guest OS corresponding to the one input unit where the startup character string is input.

3. The computer system using a virtual machine according to claim 1, wherein:

the host OS receives a forcible termination character string from one of the input units, determines whether a certain character string registered in the configuration definition table coincides with the forcible termination character string, and forcibly terminates a guest OS corresponding to the one input unit where the forcible termination character string is input.

4. The computer system using a virtual machine according to claim 1, wherein:
 a bus adapter is a USB adapter, and the input units and the output units are USB devices.

5. A client device control method using a virtual machine comprising:
 causing a physical server including a CPU, a memory, a bus, and a plurality of bus adapters to:
 operate as a virtual machine to cause a virtual machine monitor (VMM) to divide a physical resource including at least the CPU and the memory into virtual resources and for the VMM to allocate the physical resource to a plurality of guest operating systems (OSs) on the divided virtual resource basis; and
 execute a host OS that:
  manages the plurality of guest OSs,
  stores a configuration table of identification numbers of input and output units operable as client devices that are coupled to each bus adapter in correspondence with respective guest OSs used by the input and output units,
  receives and notifies respective guest OSs of input instruction information from the plurality of input units that correspond to the respective guest OSs with reference to the configuration definition table, and
  receives and outputs a processing result of respective guest OSs to the output units that correspond to the respective guest OSs with reference to the configuration definition table.

6. The client device control method using a virtual machine according to claim 5, wherein the host OS further:
 determines whether a certain character string registered in the configuration definition table coincides with a startup character string when the host OS receives the startup character string from one of the input units; and
 starts-up a guest OS corresponding to the one input unit where the startup character string is input when the startup character string coincides with the registered certain character string.

7. The client device control method using a virtual machine according to claim 5, wherein the host OS further:
 determines whether a certain character string registered in the configuration definition table coincides with a forcible termination character string when the host OS receives the forcible termination character string from one of the input units; and
 forcibly terminates a guest OS corresponding to the one input unit where the forcible termination character string is input when the forcible termination character string coincides with the registered certain character string.

8. The client device control method using a virtual machine according to claim 5, wherein the host OS further:
 receives the input instruction information from the input unit and notifies a guest OS that is registered in the configuration definition table and corresponds to the input unit of the input instruction information; and
 receives and outputs the processing result of the guest OS to the output unit corresponding to the guest OS registered in the configuration definition table.

9. A non-transitory computer-readable recording medium configured to store a program for providing control by a client device using a virtual machine, the program causing a physical server to execute:
 a virtual machine on the physical server including a CPU, a memory, a bus, and a plurality of bus adapters, the virtual machine dividing a physical resource including at least the CPU and the memory into virtual resources and allocating the physical resource to guest operating systems (OSs) on the divided virtual resource basis; and
 a host OS that:
  manages the plurality of guest OSs,
  stores a configuration table of identification numbers of input and output units operable as client devices that are coupled to each bus adapter in correspondence with respective guest OSs used by the input and output units,
  receives and notifies respective guest OSs of input instruction information from the plurality of input units that correspond to the respective guest OSs with reference to the configuration definition table, and
  receives and outputs a processing result of respective guest OSs to the output units that correspond to the respective guest OSs with reference to the configuration definition table.

10. A computer that is capable of communicating with a plurality of input and output devices as client devices, comprising:
 a computer processor, a memory, a bus, and a plurality of bus adapters connectable to the input and output devices as the client devices, wherein the computer processor is configured to:
 operate as a virtual machine that divides a physical resource including at least the CPU and the memory into virtual resources and allocates the physical resource to a plurality of guest operating systems (OSs) on the divided virtual resource basis; and
 execute a host OS that:
  manages the plurality of guest OSs,
  stores a configuration table of identification numbers of the input and output units that are coupled to each bus adapter in correspondence with respective guest OSs used by the input and output units,
  receives notifies respective guest OSs of input instruction information from the plurality of input units that correspond to the respective guest OSs with reference to the configuration definition table, and
  receives and outputs a processing result of respective guest OSs to the output units that correspond to the respective guest OSs with reference to the configuration definition table.

* * * * *

UNITED STATES PATENT AND TRADEMARK OFFICE
CERTIFICATE OF CORRECTION

PATENT NO. : 8,452,904 B2  
APPLICATION NO. : 13/004443  
DATED : May 28, 2013  
INVENTOR(S) : Akio Takebe Page 1 of 1

It is certified that error appears in the above-identified patent and that said Letters Patent is hereby corrected as shown below:

In the Claims:

Column 14, Line 45, In Claim 1, after "are" insert -- operable --.

Column 16, Line 51, In Claim 10, after "receives" insert -- and --.

Signed and Sealed this  
Seventeenth Day of September, 2013

Teresa Stanek Rea  
*Deputy Director of the UnitedStates Patent and Trademark Office*